US012665137B2

(12) United States Patent
Descarpentries et al.

(10) Patent No.: US 12,665,137 B2
(45) Date of Patent: Jun. 23, 2026

(54) METHOD FOR MANUFACTURING VERTICALLY ALIGNED CARBON NANOTUBES, AND ELECTROCHEMICAL CAPACITORS USING THESE NANOTUBES AS ELECTRODES

(71) Applicants: NAWATECHNOLOGIES, Aix-en-provence (FR); COMMISSARIAT A L'ENERGIE ATOMIQUE ET AUX ENERGIES ALTERNATIVES, Paris (FR); UNIVERSITE DE TOURS, Tours (FR)

(72) Inventors: Jérémie Descarpentries, Gif sur Yvette (FR); Cédric Desgranges, Tours (FR); Aurélien Boisset, Gardanne (FR); Martine Mayne, Les Molieres (FR); Mathieu Pinault, Fresnes (FR); François Tran Van, Fondettes (FR); Fouad Ghamouss, Joues-les-tours (FR)

(73) Assignees: NAWAH, Rousset (FR); COMMISSARIAT À L'ÉNERGIE ATOMIQUE ET AUX ÉNERGIES ALTERNATIVES, Paris (FR); UNIVERSITEÉ DE TOURS, Tours Cedex (FR)

( * ) Notice: Subject to any disclaimer, the term of this patent is extended or adjusted under 35 U.S.C. 154(b) by 795 days.

(21) Appl. No.: 16/642,369

(22) PCT Filed: Aug. 23, 2018

(86) PCT No.: PCT/FR2018/052095
§ 371 (c)(1),
(2) Date: Feb. 26, 2020

(87) PCT Pub. No.: WO2019/043320
PCT Pub. Date: Mar. 7, 2019

(65) Prior Publication Data
US 2020/0227210 A1 Jul. 16, 2020

(30) Foreign Application Priority Data

Aug. 29, 2017 (FR) ........................................ 1757948
Oct. 16, 2017 (FR) ........................................ 1759663

(51) Int. Cl.
*B32B 9/00* (2006.01)
*C01B 32/162* (2017.01)
(Continued)

(52) U.S. Cl.
CPC ........... *H01G 11/36* (2013.01); *C01B 32/162* (2017.08); *H01G 11/24* (2013.01); *H01G 11/86* (2013.01);
(Continued)

(58) Field of Classification Search
CPC ... H01G 11/36; C01B 32/162; C01B 2202/08; Y10T 428/30; B82Y 30/00
(Continued)

(56) References Cited

U.S. PATENT DOCUMENTS

2006/0078489 A1* 4/2006 Harutyunyan ......... B82Y 30/00
423/447.3
2012/0313591 A1 12/2012 Brambilla et al.
(Continued)

FOREIGN PATENT DOCUMENTS

JP 2014231446 A 12/2014
WO 03038846 A1 5/2003
(Continued)

OTHER PUBLICATIONS

Ferrari NPL 2 of 1449 Jun. 22, 2023; pubished 2001.*
(Continued)

*Primary Examiner* — Daniel H Miller
(74) *Attorney, Agent, or Firm* — Weber Rosselli & Cannon LLP

(57) ABSTRACT

A composite comprises vertically aligned carbon nanotubes (VACNT) on a substrate and additional disordered carbon
(Continued)

deposited on the outer face of the nanotubes. This additional carbon is not amorphous but comprises graphitic domains. This composite can be prepared by a chemical vapor deposition (CVD) process in the presence of a catalyst on a metal substrate at atmospheric pressure. It can be used as an electrode in electronic and electrotechnical devices, such as supercapacitors.

17 Claims, 19 Drawing Sheets

(51) Int. Cl.

| | |
|---|---|
| *H01G 11/24* | (2013.01) |
| *H01G 11/36* | (2013.01) |
| *H01G 11/86* | (2013.01) |
| *H01G 11/52* | (2013.01) |
| *H01G 11/58* | (2013.01) |
| *H01G 11/78* | (2013.01) |

(52) U.S. Cl.
CPC ...... *C01B 2202/08* (2013.01); *C01B 2202/22* (2013.01); *C01B 2202/34* (2013.01); *C01P 2002/82* (2013.01); *C01P 2002/88* (2013.01); *C01P 2004/03* (2013.01); *C01P 2004/04* (2013.01); *C01P 2006/40* (2013.01); *H01G 11/52* (2013.01); *H01G 11/58* (2013.01); *H01G 11/78* (2013.01)

(58) Field of Classification Search
USPC ....................................... 428/408; 423/445 B
See application file for complete search history.

(56) References Cited

U.S. PATENT DOCUMENTS

| | | | |
|---|---|---|---|
| 2014/0029163 A1* | 1/2014 | Lyon ...................... | H01G 11/36 216/6 |
| 2016/0118198 A1 | 4/2016 | Okuno et al. | |
| 2016/0329560 A1* | 11/2016 | Young ................... | H01M 4/383 |

FOREIGN PATENT DOCUMENTS

| | | |
|---|---|---|
| WO | 2005007926 A2 | 1/2005 |
| WO | 2007099975 A1 | 9/2007 |
| WO | 2011138595 A1 | 11/2011 |
| WO | 2012170749 A2 | 12/2012 |
| WO | 2015071408 A1 | 5/2015 |
| WO | 2015082936 A1 | 6/2015 |
| WO | 2016087857 A1 | 6/2016 |
| WO | 2018134245 A1 | 7/2018 |

OTHER PUBLICATIONS

A.C. Ferrari et al., "Interpretation of infrared and Raman spectra of amorphous carbon nitrides", Physical Review B 67, 155306 (2003).

A.C. Ferrari et al., "Resonant Raman spectroscopy of disordered, amorphous, and diamondlike carbon", Physcial review B, vol. 64, 075414.

Andrea C. Ferrari, "Raman spectroscopy of graphene and graphite: Disorder, electron-phonon coupling, doping and nonadiabatic effects"; ScienceDirect, Solid State Communications 143 (2007) 47-57.

Andrea Carlo Ferrari, "A Model to Interpret the Raman Spectra of Disordered, Amorphous and Nanostructured Carbons", Mat. Res. Soc. Symmp. Proc. vol. 675, Symposium Held Apr. 17-20, 2001.

Billyde Brown et al., "Electrochemical Charge Storage Properties of Vertically Aligned Carbon Nanotube Films: Effects of Thermal Oxidation", The Journal of Physical Chemistry, 2012, 116, 19526-19534.

Dai, Lei et al., "Large-scale production and metrology of vertically aligned carbon nanotube films", Journal of Vacuum Science & Technology A 27, 1071 (2009).

Daniela F. Baez et al., "A comparative study of electrochemical performances of carbon nanomaterial-modified electrodes for DNA . . .", Journal of Solid State Electrochemistry, Aug. 2015.

G. Atthipalli et al., "Electrochemical characterization of carbon nanotube forests grown on copper foil using transition metal catalysts", Thin Solid Films 520 (2011) 1651-1655.

Hinrich Grothe et al., "Raman Microspectroscopy of Soot and Related Carbonaceous Materials: Spectral Analysis and Structural Information", Science Direct, Carbon 43 (2005) 1731-1742.

Jo, S. H. et al., "Correlation of field emission and surface microstructure of vertically aligned carbon nanotubes", Applied Physics Letters, 84, 413 (2004).

Reich et al., "Raman spectroscopy of graphite", Phil. Trans. R. Soc. Lond. A (2004) 362, 2271-2288.

Reit et al., "Growth time performance dependence of vertically aligned carbon nanotube supercapacitors grown on aluminum substrates", Electrochimica Acta 91 (2013) 96-100.

S. Dorfler et al., "High power supercap electrodes based on vertical aligned carbon nanotubes on aluminum", Journal of Power Sources 227 (2013) 218-228.

Satoshi Yasuda et al., "Existence and Kinetics of Graphitic Carbonaceous Impurities in Carbon Nanotube Forests to Assess the Absolute Purity", Nano Letters, 2009, vol. 9, No. 2, 769-773.

Wen Lu et al., "High performance electrochemical capacitors from aligned carbon nanotube electrodes and ionic liquid electrolytes", Journal of Power Sources 189 (2009) 1270-1277.

* cited by examiner

30 μm

Figure 3(d)
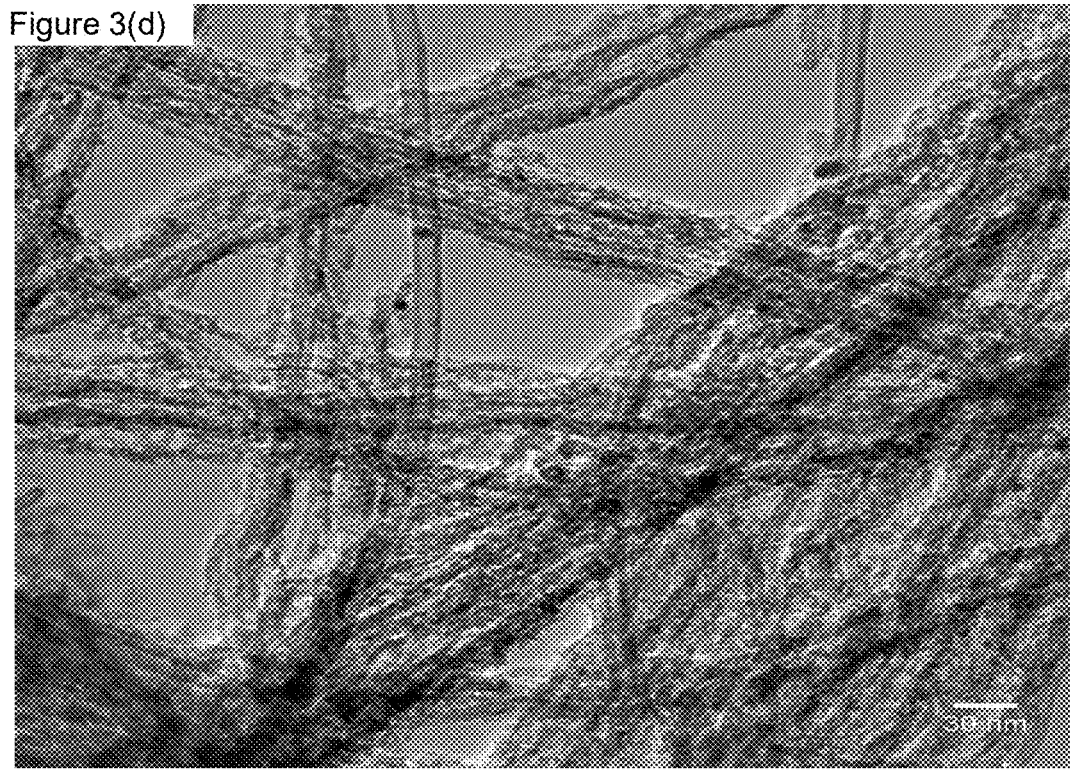
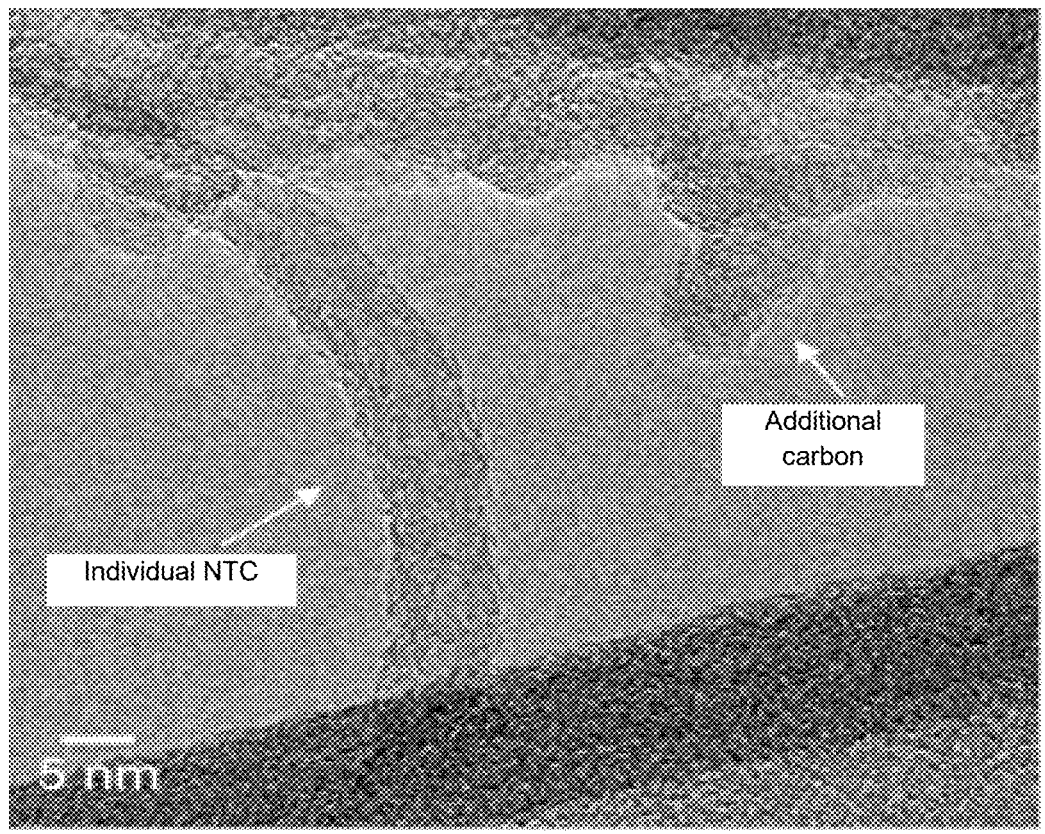
Figure 4(a)

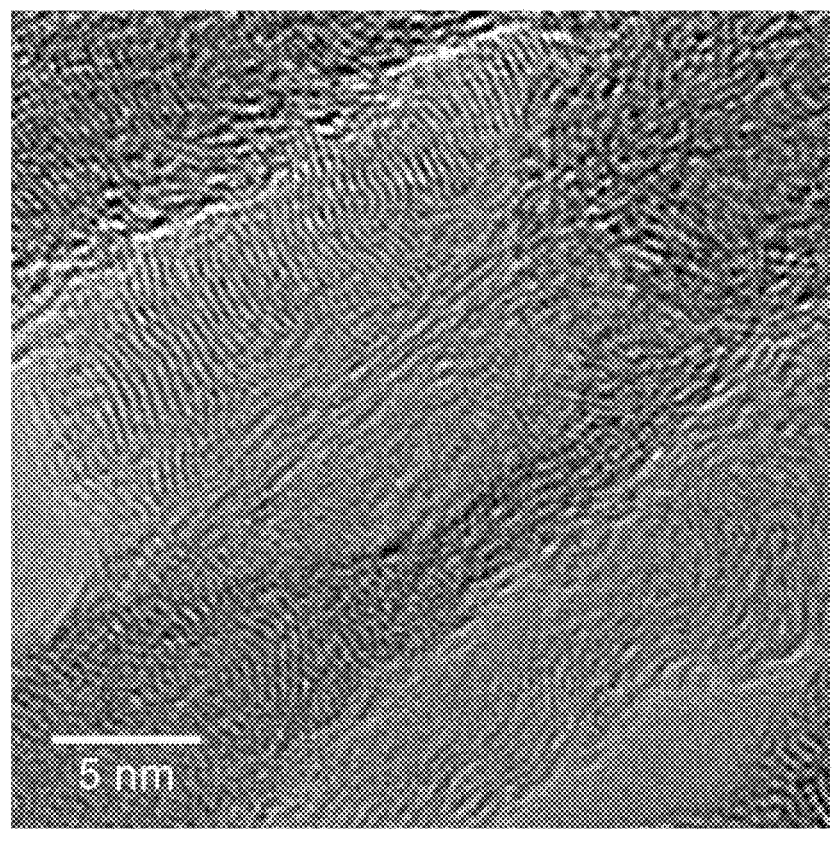
Figure 4(d)
Figure 5
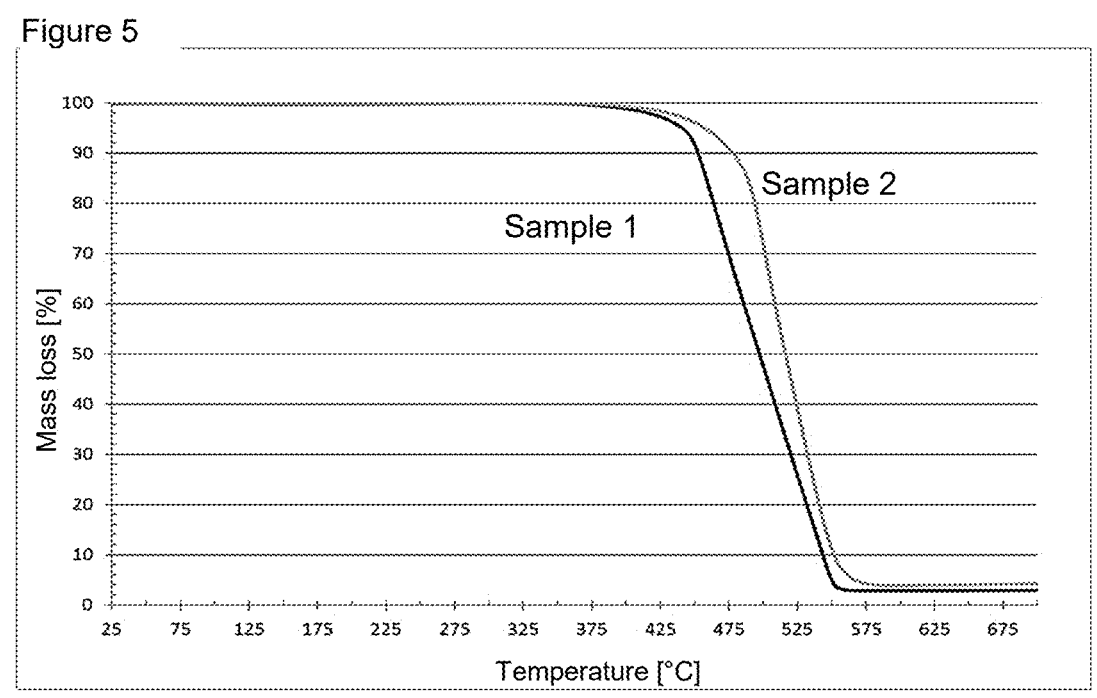

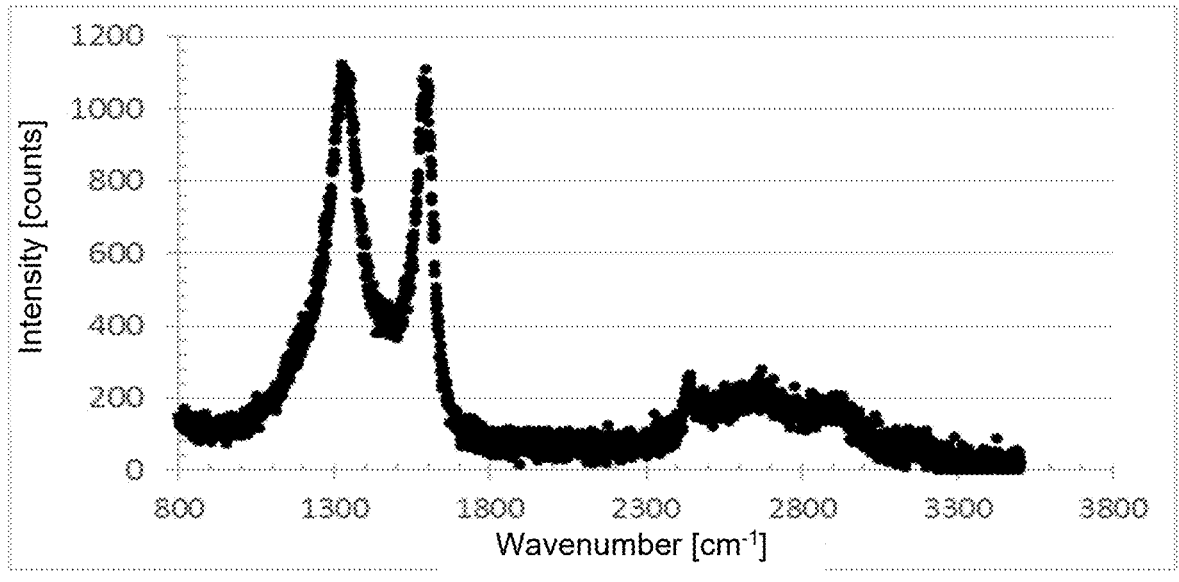
Figure 7
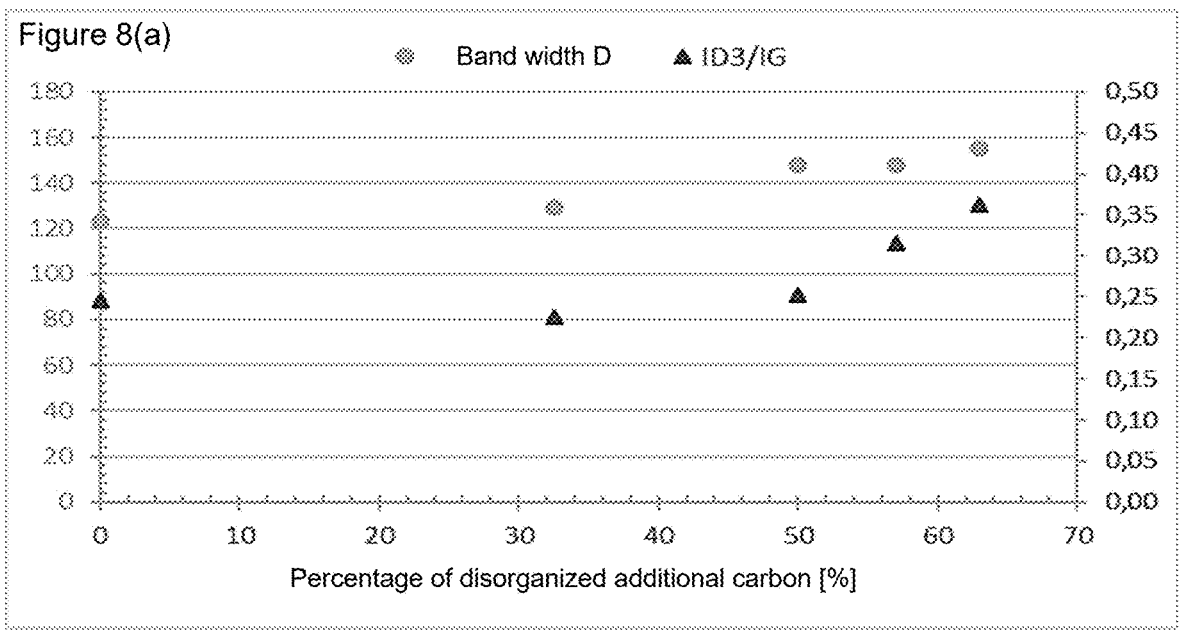

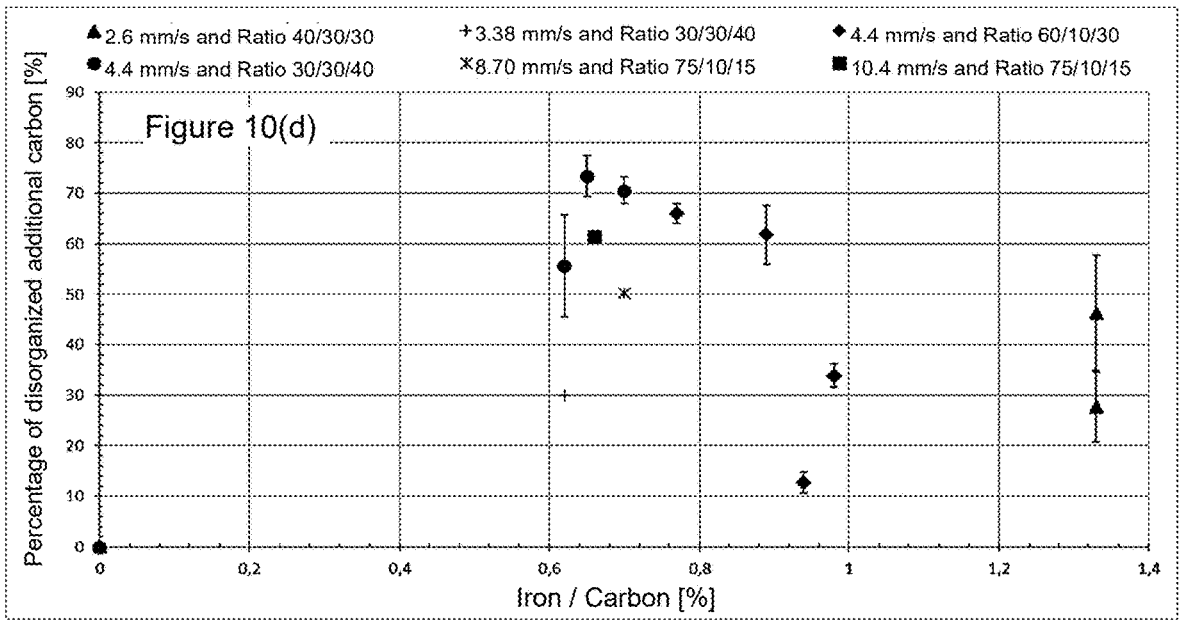
Figure 11

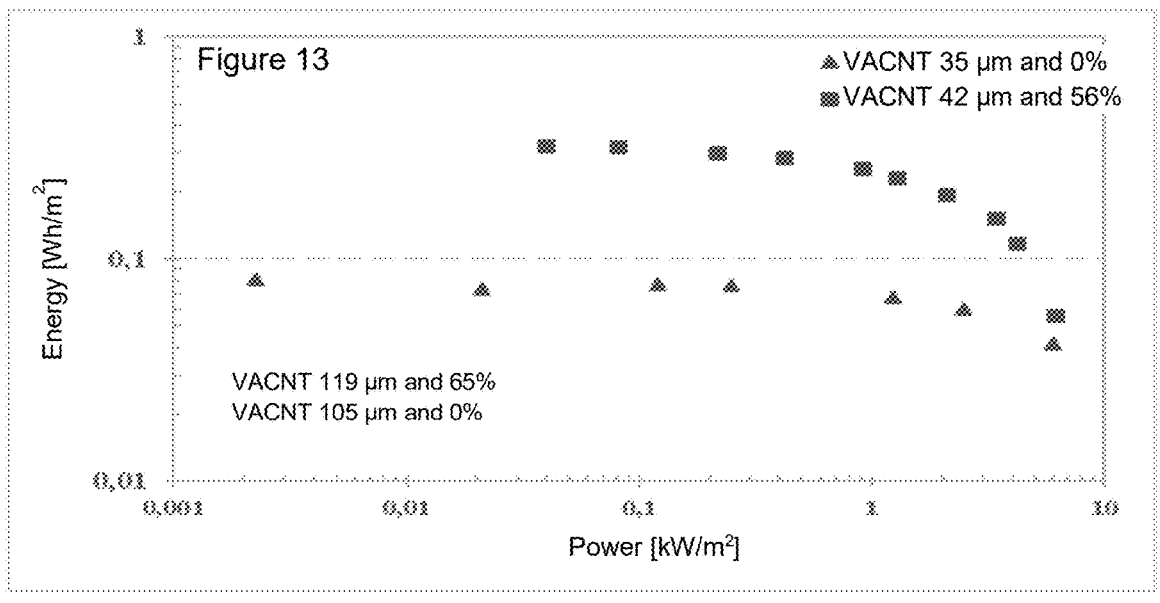
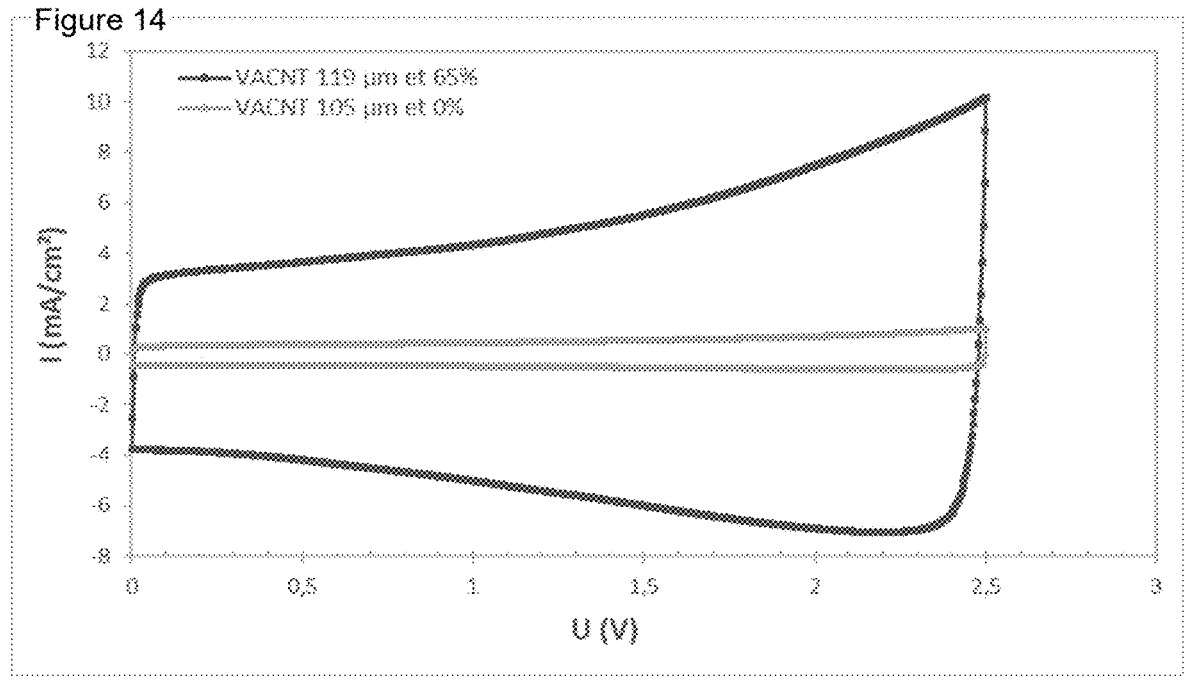

Figure 20
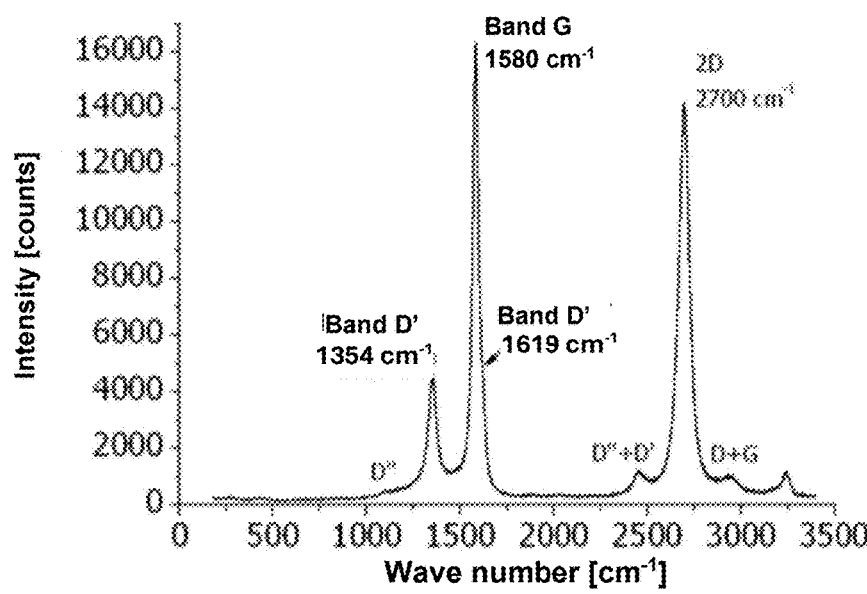
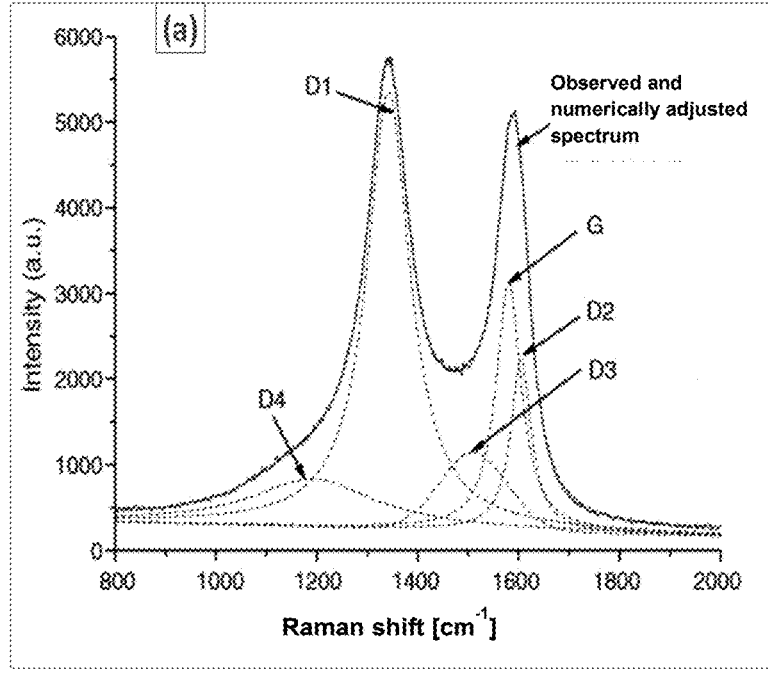
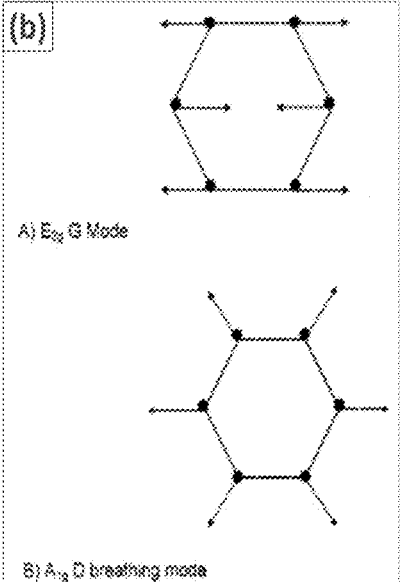
Figure 21(a)                  Figure 21(b)

METHOD FOR MANUFACTURING VERTICALLY ALIGNED CARBON NANOTUBES, AND ELECTROCHEMICAL CAPACITORS USING THESE NANOTUBES AS ELECTRODES

TECHNICAL FIELD OF THE INVENTION

The invention relates to electrical capacitors and more particularly dual-layer electrochemical capacitors, as well as the methods for manufacturing such capacitors. More particularly, these capacitors are supercapacitors. The invention also relates to the methods for depositing vertically aligned carbon nanotubes (VACNTs) on a substrate, which can be used in the manufacture of double-layer electrochemical capacitors. More particularly, the invention relates to the methods for the chemical vapor deposition (CVD) of VACNT mats on a metal substrate.

PRIOR ART

Dual-layer electrochemical (super)capacitors have been known for a long time. They comprise a negative electrode and a positive electrode, separated by a separator and immersed in an electrolyte. They are based on a capacitive mechanism: the charges are adsorbed on each electrode, creating a double electrochemical layer.

It is sought to reduce the series resistance of these devices, which leads, at each charge and at each discharge, to the transformation of electrical energy into heat; each solid/solid and solid/liquid interface contributes to the series resistance. Thus the electrodes must have a large contact surface and good intrinsic electrical conductivity. These supercapacitors often use carbon electrodes, in various forms. Numerous works have led to optimizing the nature of the carbon materials forming the electrodes.

By way of example, WO 03/038846 (Maxwell Technologies) describes a double-layer electrochemical capacitor comprising electrodes made from carbon powder, namely a first layer of conductive carbon-black powder, in contact with the metallic collector, and a second layer of active carbon, in contact with the liquid electrode contained in a porous separator. These powders as a general rule contain organic binders. WO 2007/062126 and US 2009/0290288 (Maxwell Technologies) describe electrodes comprising a mixture of conductive carbon, active carbon and organic binder.

It is now envisaged using nanostructured materials based on carbon, and a detailed discussion is given in the article "*Review of nanostructured carbon material for electrochemical capacitor applications: advantages and limitations of activated carbon, carbide-derived carbon, and graphene*" by W. Gu and G. Yushin, WIRE Energy Environ 2013, doi: 10.1002/wene.102. Among the nanostructured carbon materials envisaged as an electrode for supercapacitors there are carbon nanotubes (NTCs), and in particular vertically aligned carbon nanotubes (VACNTs), known per se.

The supercapacitors that exist on the market generally have a long service life (several million cycles) and high power densities. The major problem thereof lies in the small quantity of energy stored. CNTs generally have much smaller specific surface areas than activated carbon; for this reason, prototypes of supercapacitors based on CNTs (and even based on vertically-aligned carbon nanotubes (VACNTs)) do not make it possible to store, per unit surface area, a sufficient quantity of energy to have any industrial interest.

Since aligned CNTs have too little capacitance to by themselves alone provide significant storage properties, it has been imagined covering them with materials of the conductive polymer type; this is described in WO 2012/004317. Another supercapacitor concept involves so-called pseudocapacitive effects relating in particular to redox reactions, insertion and electrosorption. Thus supercapacitors using polymer electrodes exhibiting electron conductivity and capable of demonstrating redox behavior have been described in the literature. It has been imagined using these polymers in the form of a coating on a conductive carbon substrate with a high specific surface area. This is described for example in the publication "*Carbon Redox-Polymer-Gel Hybrid Super-capacitors*" by Vlad et al., which appeared in Sci. Rep. 6, 22194; doi: 10.1038Isrep22194 (2016).

In particular, vertically-aligned carbon nanotubes (VACNTs), the preparation of which is described for example in WO 2015/071408 (Commissariat à l'Energie Atomique et aux Energies Alternatives), represent a propitious substrate for such coatings; this is described in the document EP 2 591 151 (Commissariat à l'Energie Atomique et aux Energies Alternatives), in the doctorate thesis "*Polythiophene nanocomposites/aligned carbon nanotubes: Production, characterizations and applications to supercapacitors in an ionic liquid medium*" by Sébastien Lagoutte (Cergy-Pontoise University, 2010), and in the doctorate thesis "*Conjugate polymer nanostructured materials/vertically aligned carbon nanotubes for producing supercapacitors*" by Marina Porcher (University of Tours, 2016), as well as in the publication "*Poly (3-methylthiophene)/Vertically Aligned Multi-walled Carbon Nanotubes: Electrochemical Synthesis, Characterizations and Electrochemical Storage Properties in Ionic Liquids*" by S. Lagoutte et al., which appeared in Electrochimica Acta 130 (2014), p. 754-765. According to this publication, certain polymers with redox properties can be deposited on VACNTs by electropolymerization in an ionic liquid.

Nevertheless, one of the drawbacks of pseudocapacitive materials is their storage method by electron transfer which, though it makes it possible to intensify the storage of charges, generally reduces the cyclability of the electrodes and the charge-discharge kinetics of the device. This problem has no known solution and, in order to avoid the use of pseudocapacitive devices, it is therefore necessary to increase the quantity of energy stored per unit surface area.

Another industrial challenge with electrochemical supercapacitors is their manufacturing cost, which comprises among other things the cost of manufacturing the electrodes. The method currently having the greatest potential for industrial development on large surfaces and at low cost for the synthesis of VACNTs is chemical vapor deposition (CVD). This technique requires a catalyst based on metal (catalytic CVD). CVD methods are widely used in industry but remain expensive in mass production. It is therefore wished to develop an industrial CVD method for synthesizing VACNTs at low cost while keeping the qualities of the product with a view to application thereof to supercapacitors. In this regard it is wished in particular to carry out the CVD process at atmospheric pressure (APCVD) and at low temperature (compatible with deposition on a travelling aluminum-strip substrate), and preferably in a single step.

For synthesizing VACNTs, catalytic CVD (CCVD) can be carried out in two ways, which differ through the way in which the catalyst nanoparticles are formed in only one or in a plurality of steps. The method in a plurality of steps involves phases of preliminary deposition of thin films and thermal dewetting and usually requires the use of a reaction promotor. It lends itself less well to industrial production than the method in a single step (aerosol-assisted CCVD method). In the latter, the catalyst and carbon precursors are introduced simultaneously into the reactor, and the catalyst nanoparticles are formed in the gaseous phase and are then deposited on the substrate, where they form kernels for nucleation and the continuous growth of carbon nanotubes at atmospheric pressure without the addition of a promotor. This method is robust and fairly simple to implement; it is described in the document EP 1 515 911 (Commissariat à l'Energie Atomique et aux Energies Alternatives).

Though there is a good hope of being able to manufacture VACNT mats having great thickness (i.e. a great length of VACNT) by low-cost continuous methods, the problem of the energy storage capacity per unit surface area of super-capacitor devices manufactured from these VACNT mats for the moment remains without any obvious solution.

Other factors that have an influence on the quality of VACNTs are the purity of the carbon deposited (i.e. the presence and nature of heteroatoms), the presence of disorganized regions within the nanotubes making up the VACNTs, and the proportion (and structure) of the carbon deposited in a form other than carbon nanotubes. The impact of each of these factors on the quality of electronic devices using these VACNTs is not completely clear, in particular with regard to supercapacitors. There does however appear to exist a consensus that VACNTs for supercapacitors must be chemically pure and structurally ordered.

More precisely, according to the publication "*Existence and Kinetics of Graphitic Carbonaceous Impurities in Carbon Nanotube Forests to Assess the Absolute Purity*" by S. Yasuda et al., which appeared in 2009 in Nano Letters, Vol. 9(2), p. 769-773, the absence of impurities is an essential quality factor for VACNTs used in supercapacitors. Disorganized regions within VACNTs are mentioned, but the effect thereof is not characterized. Brown et al. ("*Electrochemical Charge Storage Properties of Vertically Aligned Carbon Nanotube Films: Effects of Thermal Oxidation*", The Journal of Physical Chemistry, p. 19526-19534 (2012)) considers that the disorganized regions are liable to block the penetration of the charges in the VACNT mat and proposes oxidizing heat treatment for removing them. Consistent with this teaching, W. Lu et al. ("*High performance electrochemical capacitors from aligned carbon nanotube electrodes and ionic liquid electrolytes*", J. Power Sources, 189(2), 1270-1277 (2009)) show that eliminating the amorphous carbon deposited on the surface of the nanotubes forming the VACNTs by plasma etching increases the capacitance of the supercapacitors.

The publication "*Electrochemical characterization of carbon nanotube forest grown on copper foil using transition metal catalysts*" by G. Atthipalli et al., which appeared in 2011 in the journal Thin Solid Films 520, p. 1651-1655, teaches that the good crystallinity of VACNTs with multiple walls (in contradistinction to amorphous carbon) promotes the storage capacity of charges in a supercapacitor. The publication "*Growth time performance dependence of vertically aligned carbon nanotube supercapacitors grown on aluminum substrates*" by R. Reit et al., which appeared in 2013 in the journal Electrochimica Acta 91, p. 96-100, describes the presence of amorphous carbon that is deposited on the top surface of the VACNT mat; this deposit would appear to cause the formation of the double electrolytic layer in the supercapacitors. S. Dörfler et al. ("*High

*power supercap electrodes based on vertically aligned carbon nanotubes on aluminum*", J. Power Sources 227, p. 218-228, (2013)) describes the presence of amorphous carbon in the VACNT layer, which would appear to reduce the capacitance of the supercapacitors.

In conclusion, in order to reduce this proportion of disorganized or amorphous carbon considered to be detrimental, the publications cited propose either an oxidizing or basic treatment for removing it after the deposition (Brown et al., Li et al., Kim et al., Lu et al.), or particular operating conditions that avoid such deposition (Atthipalli et al., Reit et al., Dörfler et al.). These two approaches make the method of manufacturing the electrodes more complex or more constraining.

The inventors find that there exists a need to provide an improvement to the VACNT mats (also called "forests") with a view to use thereof as an electrode in supercapacitors. In particular, it will be desirable to improve the energy storage capacity per unit surface area of the supercapacitor devices manufactured from these VACNT mats. The prior art does not however offer any pathways for arriving at such an improvement.

BRIEF DESCRIPTION OF THE FIGURES

The figures illustrate certain aspects of the invention or of the prior art, as will be explained below. They do not limit the scope of the invention.

FIGS. 3(a)-3(d) show images obtained by scanning electron microscopy (SEM), (FIGS. 3(a), (b) and (c)) and by transmission electron microscopy (TEM, FIG. 3(d)) on regions of the sample NGI-1067, at different magnifications. The length of the bar at the bottom of each image indicates the length of approximately 100 µm (FIG. 3(a)), of approximately 30 µm (FIG. 3(b)), of approximately 100 nm (FIG. 3(c)), and of approximately 30 nm (FIG. 3(d)).

FIGS. 4(a)-4(d) show images obtained by high-resolution transmission electron microscopy on regions of the sample NGI-1067, of an individual CNT with a disorganized additional carbon deposit.

FIG. 5 shows a thermogravimetric analysis (TGA) of two samples of a VACNT mat according to the invention with different amounts of disorganized additional carbon.

FIG. 7 shows the typical Raman spectrum obtained on a sample of VACNT according to the invention with a proportion of 33% disorganized carbon.

FIGS. 8(a)-8(b) show parameters derived from the width of certain bands of the Raman spectrum for various samples of VACNT mat according to the invention having a different proportion of disorganized additional carbon. FIG. 8(a) shows the width of the band D on the principal axis (circular dots) and the ratio between the intensity of band 3D and the intensity of band G on the secondary axis (triangular dots); FIG. 8(*b*) shows the ratio between the width of the band D and the width of band G.

FIG. 9(*b*) shows the height of the VACNT mats as a function of the duration of the synthesis, for the same synthesis conditions as FIG. 9(*a*).

FIG. 10(*d*) shows, for the same synthesis conditions, the proportion of disorganized additional carbon.

FIGS. 11 and 12(*a*)-12(*b*) show three types of enclosure that can contain supercapacitors according to the invention: an enclosure of the button battery type (FIG. 11), an enclosure of the flexible pouch type (FIG. 12(*a*)) and an enclosure of the cylindrical battery type (FIG. 12(*b*)).

FIG. 13 shows a 2.5 V Ragone plot of two supercapacitors with an electrolyte formed from 1M $ET_4N$ $BF_4$ in acetonitrile and two electrodes formed by a VACNT mat with a thickness of 42 μm and 36 μm. Square dots: 56% disorganized additional carbon (sample NGI-1113); triangular dots: no disorganized additional carbon (sample NI-766).

FIG. 14 shows a comparative voltammogram of two supercapacitors: one comprises, as electrode material, a VACNT mat (reference NGI-1067) with a thickness of 105 μm and 119 μm with 65% disorganized additional carbon, the other a VACNT mat with the same thickness but without disorganized additional carbon (reference NI-836).

FIG. 20 shows the Raman spectrum characteristic of multi-leaf CNT, with the naming of the bands.

FIGS. 21(*a*)-21(*b*) show the Raman spectrum characteristic of multi-leaf carbon nanotubes with a numeric deconvolution of the bands (FIG. 21(*a*)) and the symmetry modes associated with bands G and D (FIG. 21(*b*)).

OBJECTS OF THE INVENTION

Figure 1:
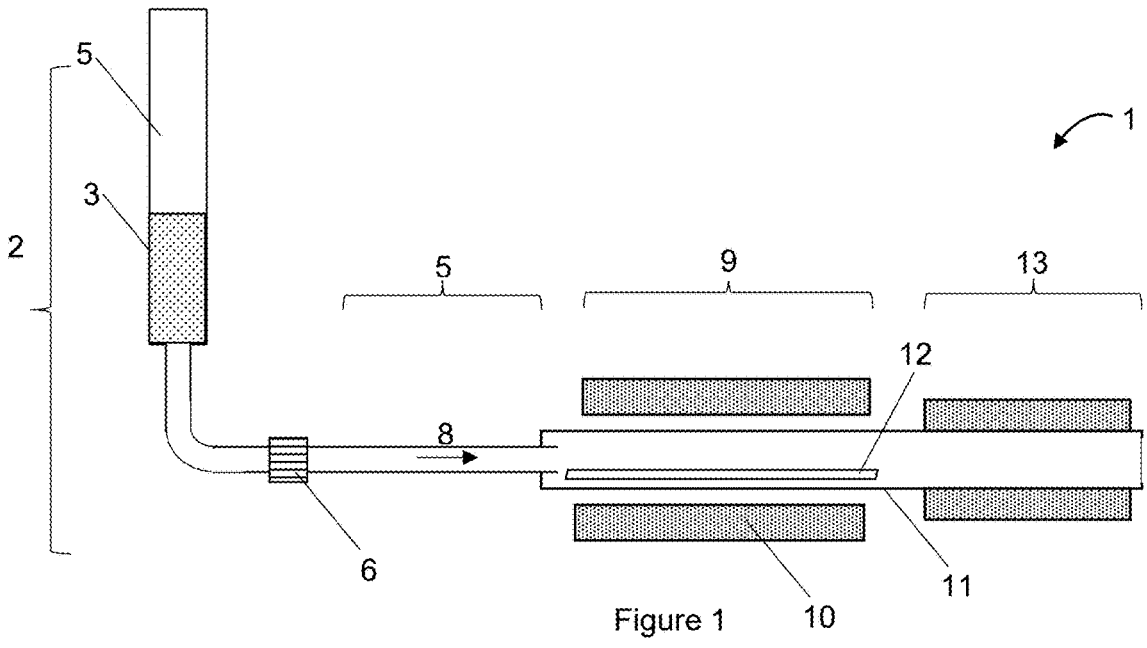
FIG. 1 shows schematically a batch reactor that was used to produce VACNTs for implementing the invention.

The inventors have discovered surprisingly that the presence of disorganized additional carbon in the VACNT mat can improve the energy storage capacity per unit surface area of the supercapacitor devices manufactured from these VACNT mats. In particular, it is the presence of disorganized additional carbon deposited on the external face of the nanotubes that causes this improvement effect. Unlike the prior art cited above, in the present invention not only is it not sought to remove the disorganized carbon after the deposition of the VACNTs, but it is also sought to promote the deposition of disorganized carbon.

Thus, according to the invention, the use of VACNT including disorganized carbon makes it possible to increase the capacitance per unit surface area and per unit volume of the device while keeping a purely capacitive storage mode. Such a configuration (alignment and regular spacing of a CNT matrix incorporating disorganized additional carbon) will afford a significant gain in capacitance (and therefore in energy $E=\frac{1}{2}CV^2$ at constant voltage) without losing in power or cyclability (compared with pseudocapacitive storage materials).

A first object of the invention is a composite comprising vertically aligned carbon nanotubes (VACNTs) on a substrate, characterized in that said composite comprises disorganized additional carbon deposited on the external face of the nanotubes.

According to particular embodiments of the invention, said nanotubes are in particular nanotubes with multiple walls; said disorganized additional carbon comprises graphitic domains; said composite comprises at least 10%, preferably at least 30%, and even more preferentially at least 50% disorganized additional carbon, based on the mass of the carbon nanotubes (but preferably not more than 90%, and more preferentially not more than 80%); the width ratio between band D and band G in a Raman spectrum of the VACNTs (recorded with an excitation wavelength of 532 nm and a laser power of 0.2 nW) is greater than 2.0, preferably greater than 2.2, and even more preferentially greater than 2.4.

The mean length of the nanotubes is between 30 μm and 300 μm, preferably between 50 μm and 150 μm, and even more preferentially between 70 μm and 130 μm; these preferential ranges refer in particular to the suitability of the composite for being used as an electrode in a supercapacitor.

The substrate of said composite may be a metal sheet or a metallic foil, preferably based on aluminum.

Another object of the invention is a composite according to the invention capable of being obtained by a chemical vapor deposition method in the presence of a catalyst in a heated enclosure, a precursor of said catalyst being injected continuously into said heated enclosure. This method leads to a composite, the carbon nanotubes of which comprise (and in particular: contain at the center thereof) metal particles coming from said catalyst.

Another object of the invention is a set of aligned and parallel carbon nanotubes, obtained from a composite according to the invention by removal of the nanotubes from said substrate. Such a set of aligned and parallel carbon nanotubes is in particular formed by a self-supporting VACNT mat. It may also be supported by a substrate other than the one on which it was initially prepared from a gaseous phase, by substitution of the substrate in accordance with techniques known to persons skilled in the art. When the VACNTs are removed from their native substrate the proportion of disorganized additional carbon does not change.

The invention also relates to a method for generating a composite comprising VACNTs on a substrate, said composite comprising a deposit of disorganized additional carbon. This deposit, which may be obtained in the same process step as the deposition of the VACNTs, enhances the electrochemical storage properties per unit surface area, whereas the prior art generally describes the disorganized carbon (additional or not) as being detrimental to the performance and which it is sought to eliminate (by thermal oxidation for example) or to avoid it by an appropriate conduct of the VACNT deposition method. The method according to the invention comprises the chemical deposition of a carbon-source gas in a reactor comprising a heated enclosure and the growth of the VACNTs on a substrate, in the presence of a catalyst, wherein a gaseous phase comprising said carbon source and a catalyst precursor is injected continuously into said heated enclosure at a temperature of between 500° C. and 700° C. and at a pressure of between 0.5 bar and 1.5 bar;

said catalyst precursor comprises a transition metal, preferably chosen from the group consisting of iron, nickel and cobalt.

According to particular embodiments, the pressure in said enclosure is between 0.6 bar and 1.4 bar, preferably between 0.8 bar and 1.2 bar, and even more preferentially between 0.9 bar and 1.1 bar; said enclosure is heated to a temperature below 670° C., preferentially below 650° C. and even more preferentially between 500° C. and 630° C.; said gaseous phase injected into said enclosure comprises acetylene as a source of carbon, the catalyst precursor with its carrier gas (which may be a source of carbon), and optionally an inert gas (preferably argon); said gaseous phase injected into said enclosure also comprises hydrogen, preferably between 25% and 100% (more preferentially between 50% and 85%) of the acetylene+hydrogen sum; the gaseous phase injected into said enclosure consists essentially of acetylene as a source of carbon, hydrogen, ferrocene as a catalyst precursor, toluene as a carrier gas for the ferrocene, and argon as an inert gas; the speed of passage of said gaseous phase is between 1 mm/s and 15 mm/s, and preferably between 3 mm/s and 10 mm/s.

Preferably, the iron content based on the total carbon content in the gaseous phase, that is to say the Fe/C ratio by mass, is between 0.4% and 1.2%, preferably between 0.5% and 1.1%, and even more preferentially between 0.55% and 0.9% (as a percentage by mass).

Yet another object of the invention is the use of a composite according to any of claims 1 to 9 or of a set of carbon nanotubes according to claim 10 as an electrode for an electronic or electrotechnical device.

Yet another object of the invention is an electrode for an electronic or electrotechnical device, characterized in that it comprises at least one electrode comprising a composite or a set of nanotubes according to the invention. Said electronic or electrotechnical device may be an electrochemical capacitor, such as a supercapacitor. The latter represents another object of the present invention; at least one of these two electrodes (and preferably both) may comprise a composite according to the invention or a set of nanotubes according to the invention. In such a supercapacitor, the two electrodes are contained in an enclosure, separated by a separator, and said device also comprising an electrolyte that comprises at least one anion, at least one cation, and optionally a solvent.

A last object of the present invention is a method for manufacturing such a supercapacitor, comprising the following steps:

(i) the provision of electrodes according to the invention, of separators, of current collectors, of the electrolyte and of an enclosure;

(ii) the welding (preferably ultrasonic) of the current collectors on the electrodes, (iii) the assembly of the electrodes and separators, (iv) the welding (preferably ultrasonic) of the current collectors of the electrodes to the terminals of the enclosure;

(v) the fitting of the electrode/separator assembly in the housing enclosure (knowing that steps (iv) and (v) may be reversed), (vi) the addition and diffusion of the electrolyte in said enclosure, (vii) the sealing of the enclosure.

In one embodiment, the capacitor device according to the invention is a system of the symmetrical type comprising two electrodes of the same nature, said electrodes being formed by a metal substrate (preferably aluminum) on which a mat of vertically aligned carbon nanotubes (VACNT) having said disorganized additional carbon is deposited. Said capacitor device moreover comprises a liquid electrolyte. Such a device according to the invention makes it possible to store more electrical charges than an identical system manufactured with electrodes having a VACNT mat with the same mean length and the same mean surface density but which does not have any disorganized additional carbon.

The invention also relates to an improved electrode for a supercapacitor comprising a substrate and a VACNT mat having disorganized additional carbon.

DETAILED DESCRIPTION

We describe here embodiments of the invention. Unless otherwise stated, the percentages indicated for solids or liquids are percentages by mass.

1. Description of the Method for Synthesizing VACNTs

According to the invention, the growth of the VACNTs on a substrate is done in the presence of a source of catalyst and a source of carbon, which are both introduced continuously into the reactor. According to a highly advantageous embodiment, the source of catalyst is introduced into the reactor in liquid form after dissolution of the catalytic precursor in a carbon solvent, and the source of carbon in gaseous form; this can be done by pulsed injection by means of an injection pump, as described in the patent EP 1 515 911 cited above.

According to an essential aspect of the invention, the reactive gases comprise a "carbon source" gas and a "catalyst precursor". The catalyst precursor may be predeposited on the substrate or, on the other hand (and preferably), be co-injected with the carbon source; the latter variant allows an uninterrupted growth of the carbon nanotubes on the substrate. The catalyst precursor is in particular chosen from transition-metal metallocenes such as for example ferrocene, nickelocene, cobaltocene or any one of the mixtures thereof. The carbon source may be liquid, solid or gaseous; it is in particular chosen from hydrocarbons, alcohols, carbon monoxide, carbon halides (the latter being less preferred), toluene, cyclohexane, oils of plant origin, benzylamine, acetonitrile, ethylene, acetylene, xylene, methane and any of the mixtures thereof.

In a particular embodiment of this synthesis, the catalyst precursor is ferrocene. Being solid, it is dissolved in a suitable solvent, such as toluene, and conveyed into the reactor in the form of an aerosol of droplets of a solution. In this embodiment, the toluene is merely a carrier of the ferrocene and does not decompose significantly in the preferred temperature range of the method.

The preferred carbon source in the context of the present invention is acetylene, the decomposition temperature of which is compatible with the preferred temperatures of the method. The most preferred embodiment combines acetylene as the carbon source and ferrocene as the catalyst precursor, with an addition of hydrogen (preferably not exceeding 30% of the total gaseous flow).

According to an advantageous embodiment of the invention, the synthesis of the VACNT mat is effected by CVD on a metal substrate (in particular on aluminum, if the temperature is not too high), at low temperature (below 700° C., preferably below 670° C., and preferably between 500° C. and 650° C.), and preferably at atmospheric pressure. It is possible to use a batch reactor, or a continuous reactor (preferably of the "roll-to-roll" type). Preferably the substrate is a metal strip that travels in a reaction zone in which the deposition of the VACNTs by CVD takes place. By way of example, a temperature of between approximately 580° C. and approximately 630° C. is preferred in static mode, and this temperature is also suitable with a travelling substrate.

The temperature indicated above corresponds to the set temperature of the furnace; it corresponds to the temperature of the substrate under stationary gas flow conditions, in the absence of any VACNT deposition reaction. In practice, these conditions can be achieved by adopting the conditions of the reaction, injecting all the gases at the planned rate, except for the catalyst precursor, which is absent. This is because the catalytic reaction of decomposition of the acetylene being exothermic in the conditions of the method according to the invention, the local temperature of the substrate during the reaction may be higher than the set temperature.

The pressure is advantageously atmospheric, this expression encompassing a slight overpressure or underpressure based on atmospheric pressure. More precisely, in an advantageous embodiment the pressure is between 0.6 bar and 1.4 bar, preferentially between 0.8 bar and 1.2 bar and even more preferentially between 0.9 bar and 1.1 bar.

The preferred carbon-source gas is acetylene, which is compatible with the temperatures of the method between 500° C. and 650° C. The gaseous mixture in the reactor must comprise hydrogen, which allows decomposition of the metallocenes and in particular of ferrocene. The hydrogen may come from the decomposition of the acetylene at the advantageous temperatures of the method according to the invention, but it is preferable to add gaseous hydrogen to the reaction mixture.

The preferred catalyst precursor is ferrocene, which, by decomposing, forms nanometric iron particles. The iron catalyzes the decomposition of the acetylene, and said iron particles act as a kernel for the growth of nanotubes.

In an advantageous embodiment, the catalyst source (for example ferrocene) is dissolved in a suitable solvent (for ferrocene, for example, toluene). In an advantageous embodiment of the method according to the invention, the ferrocene content in the toluene is between 2.5% and 12%, and preferentially between 7.5% and 11%.

Ferrocene decomposes at a temperature of approximately 826° C., which makes it possible to grow the VACNTs at a temperature of around 850° C., but not at a temperature of around 670° C. or less (as is preferred in the context of the present invention). This is because, below the normal temperature of decomposition of ferrocene (826° C.), it proves necessary to add hydrogen in order to release the iron atoms from the ferrocene at a lower temperature, which is advantageously between 400° C. and 450° C.

In addition, in the temperature range in which the method according to the present invention takes place, which is around 670° C. or less (preferably below 650° C. and even more preferentially below 630° C. toluene decomposes very little and therefore does not constitute a carbon source favorable to the growth of CNTs. Consequently it is necessary to introduce a carbon source that decomposes at lower temperature; this carbon source is highly advantageously acetylene.

FIG. 1 shows schematically a batch reactor 1, which makes it possible to deposit VACNTs that can be used for implementing the invention. An injection unit 2 makes it possible to inject (preferably at ambient temperature) a liquid solution 3 (contained in a reservoir 4) comprising the catalyst precursor (preferably ferrocene dissolved in toluene) in the evaporator 5 in the form of fine droplets in a carrier gas. Said droplets are generated by an injection system that generates the aerosol 6 through which said carrier gas travels. The latter advantageously comprises the carbon-source gas, or said carbon-source gas may be added downstream of the injection system 6. The evaporator 5 is heated by a first heating means (not shown in the figure; in this case and optionally this heating means allows regulation of at least two (and preferably three) temperature zones) so as to at least partly evaporate the solvent from the injected fine droplets previously formed. The catalyst precursor is transported in a flow of carrier gas 8 to the furnace unit 9 where the synthesis of the VACNT takes place. Said furnace unit 9 comprises a second heating means 10, preferably tubular (which, in this case and optionally, allows the regulation of at least two (preferably three) temperature zones), in which a tube 11 is inserted, preferably made from metal or quartz. This tube 11 is connected to the evaporator 5 and has said gaseous flow travelling through it. The substrate 12, which may be a strip or individual pellets (preferably placed on a strip), is placed in said tube; the deposition of the VACNT mat takes place on this substrate 12. The reactor 1 may comprise, downstream of the furnace unit 9, a cooling zone 13. The gaseous flow passes through traps (not shown in the figure) downstream of the furnace in order to condense the gases and to remove any particles that might have been entrained as far as this point. The gas flows are regulated in a known manner by a gas-distribution panel (not shown in the figure) with a flow meter (manual or automatic) by type of gas (Ar, $H_2$, $C_2H_2$); the regulation of the pressure may take place manually or automatically. A reactor that can be used for the deposition on a travelling substrate is described in the document FR 3 013 061 (Commissariat à l'Energie Atomique et aux Energies Alternatives).

One of the particularities of the method according to the invention lies in the fact that the growth of the VACNTs and the deposition of the disorganized additional carbon take place in the same step of the method, concomitantly.

According to the invention, in order to favor the presence of the disorganized additional carbon in the intertube space:

The preferential set temperature range of the furnace is advantageously situated between 580° C. and 630° C.

The preferential range of the Fe/C ratio is advantageously between 0.4% and 1.5%.

The preferential range of the total $C_2H_2$ volume injected is advantageously between 1 and 9 liters.

The preferential range of speed of passage of the gases is advantageously between 2 mm/s and 11 mm/s.

More generally, the inventors realized that the formation of the disorganized additional carbon is favored by a high total acetylene volume, a low speed of passage of the acetylene flow (which leads to a fairly residence time for the acetylene in the reaction zone), and a fairly low catalyst content (but sufficient to fulfil its catalyst role). Thus the formation of the disorganized additional carbon in the inter-tube space is favored by the coexistence of the following ranges of parameters:

The total volume of acetylene is between 0.7 and 6 ml/mm$^2$: this parameter expresses the volume (in milliliters) of acetylene injected into the reaction chamber based on the cross-section (in mm$^2$) of said reaction chamber, said cross-section having this flow of acetylene pass through it;

The speed of passage of said flow of acetylene is between 1 mm/s and 15 mm/s, and preferably between 1 mm/s and 10 mm/s, and even more preferentially between 2 mm/s and 10 mm/s;

The iron content expressed by the Fe/C ratio by mass is between 0.4% and 1.5%, preferably between 0.4% and 1.4%, more preferentially between 0.5% and 1.4%, more preferentially between 0.5% and 1.1% and even more preferentially between 0.5% and 0.9%; in this ratio the carbon is the total carbon in the gaseous flow.

For these deposition conditions expressed by all these three parameters, the set temperature of the reaction chamber is advantageously situated between 580° C. and 630° C.; this temperature range is particularly well suited to deposition on an aluminum substrate.

A VACNT mat that is particularly favorable for use as an electrode in supercapacitors has a proportion of disorganized additional carbon greater than 50%, and preferably has a height of the VACNTs of between approximately 70 μm and approximately 150 μm, even more preferentially between approximately 75 μm and approximately 130 μm (a value of approximately 120 μm being optimal). Such a product can be obtained using the parameters indicated in the previous paragraph under the following conditions The preferential set temperature range of the furnace is between 600° C. and −30° C.; and/or The preferential range of the Fe/C ratio is between 0.6% and 0.8%; and/or The preferential range of speed of passage of the gases is between 2 mm/s and 8.7 mm/s;

knowing that, even more preferentially, two of these criteria are added together, or all three.

2. Characterization of VACNT Mats Having Disorganized Additional Carbon

According to an essential aspect of the invention, the VACNT mat comprises disorganized additional carbon. The presence of this disorganized additional carbon can be demonstrated by Raman spectroscopy, but this technique does not make it possible to locate it. The disorganized additional carbon can be viewed directly by scanning electron microscopy (SEM), but this technique does not make it possible to characterize the degree of disorder thereof. The only technique that makes it possible to view and characterize its disorganized structure is high-resolution transmission electron microscopy (HR-TEM); the field of view thereof is however very limited.

We describe here characterization by Raman spectroscopy. The identification, designation and interpretation of the broadening of the bands that appear in the Raman spectrum of graphitic materials is known to persons skilled in the art, see for example: "*Raman spectroscopy of graphite*" by S. Reich and C. Thomsen (Phil. Trans. R. Soc. Lond. 1 (2004) 362, p. 2271-2288; and "*Raman spectroscopy of graphene and graphite: Disorder, electron-phonon coupling*

*doping and nonadiabatic* effects" by A. Ferrari (Solid State Communications 143 (2007), p. 47-57).

A characteristic Raman spectrum representing an aligned carbon nanotube is shown in FIG. 20 (see: C. Castro, "*Aligned carbon nanotube growth mechanisms: catalyst-nanotube relationship*", doctorate thesis, University of Paris XI (Orsay), 2009). FIG. 21(*a*) shows the decomposition of bands D, D' and G, FIG. 21(*b*) symmetry modes associated with these bands. FIG. 7 shows a Raman spectrum of a VACNT sample according to the invention, FIGS. 8(*a*) and (*b*) show the use of numerical parameters obtained from Raman spectra, as explained below in general terms, and specifically in section 1 of the part "Examples".

In the range 800-1800 cm$^{-1}$, carbon nanotubes are characterized primarily by two principal bands D (respiration mode of the symmetry $A_{1G}$) and G (due to the phonons of the central zone of the symmetry $E_{2G}$ respectively centered at 1350 cm$^{-1}$ and 1580 cm$^{-1}$. Band G is characteristic of the degree of organization of the carbon and it attributed to the relative movements of the carbon atoms of type sp$^2$ located in the aromatic rings constituting the graphene leaves (or planes). Band D (or D1) is proportional to all the defects in the broad sense since it characterizes the size of the crystallites, it may represent the presence of amorphous carbon and is attributed to the carbons of the aromatic rings in the presence of structural defects (see F. Tuinstra and J L Koenig, "*Raman Spectrum of Graphite*", J. Chem. Phys. 53, 1126-1130 (1970)).

To these two principal bands there are possibly added two other bands: band D2 centered at 1620 cm$^{-1}$ (shoulder of band G) reflects the distribution of the inter-leaf distances; and band D3 centered at 1500 cm$^{-1}$ situated between bands D and G and representing the presence of local defects particular to sp$^3$ hybridized amorphous carbon (such as hybrid carbons sp$^3$ hybridized amorphous carbons among very mainly sp$^3$ hybridized structures or interstitial defects (see T Jawhari et al., "*Raman spectroscopic characterization of some commercially available carbon black materials*", Carbon 33, 1561-1565 (1995)) and Y C Choi et al., "*Novel Method of Evaluating the Purity of Multiwall Carbon Nanotubes Using Raman Spectroscopy*", J. Nanomater. 2013, 1-6 (2013)). These two studies also reveal a band with its maximum situated between 1250 and 1300 cm$^{-1}$, often named D4 and integrated in the foot of the peak of band D, which would correspond to the unique contribution of sp$^3$ hybridized amorphous carbon. In addition, secondarily at 2700 cm$^{-1}$ a band 2D (harmonic of band D) can be observed, it is independent of the defects and is often encountered in perfect graphitic structures.

It is commonly accepted in the literature that the structural quality of carbon nanotubes can be evaluated by the ratio of the intensities of bands D and G (ID/IG), and more rarely by the ratio of the intensities I2D/IG (see the Castro thesis cited). The lower these ratios, the better the structural quality of the carbon, namely there are fewer structural defects. However, it is known that the ID/IG radio is insufficient for judging the more or less amorphous nature of a carbon structure (it may decrease in absolute value when the proportion of sp$^3$ hybridized amorphous carbon increases, see A C Ferrari & J. Robertson, "*Resonant Raman spectroscopy of disordered amorphous and diamondlike carbon*", Phys. Rev. B64, (2001)). This is why, in the context of the present invention, apart from the ratio of the ID/IG and I2D/IG intensities, the ratio of the ID3/IG intensities was also evaluated (see Sadezki et al., "*Raman Microspectros-*

*copy of Soot and Related Carbonaceous Materials: Spectral Analysis and Structural Information*", Carbon 43 (2005), p. 1731-1742)).

In order to determine the intensity ratios of the bands, it is necessary to decompose (deconvolute) the characteristic bands of the spectrum. For this purpose, an identical procedure was applied: first of all, a base line is defined, since each band is adjusted by imposing a given range in wave number, in particular the deconvolutions were carried out in the range from 1200 to 1700 cm$^{-1}$ in order to determine the various components of bands D and G. The adjustments are carried out by applying a Voigt function that corresponds to a combination of a Gaussian function and a Lorentzian function; after adjustment of the deconvoluted theoretical bands to the curve corresponding to the experimental spectrum, bands D and G have a completely Lorentzian contribution, band 2D is at the Lorentzian two-thirds while the components of bands D2, D3 and D4 prove to be mainly Gaussian. The position at the center, the height (or intensity), the width halfway up and the area of each of these contributions can thus be determined.

The presence of disorganized additional carbon can be viewed directly by scanning electron microscopy (SEM). It is observed that it is deposited outside the nanotubes, between the tubes of the mat (see FIG. 3(*c*), in comparison with FIG. 2(*c*), which does not show any additional carbon). Thus this carbon that is deposited outside the tubes is "additional" carbon since it does not form part of the nanotubes themselves. Scanning electron microscopy (SEM) makes it possible to work with a sufficiently broad field of vision to view this additional carbon precisely outside the nanotubes (FIG. 3(*d*)) in comparison with FIG. 2(*d*) obtained by a sample without any additional carbon). With regard to the location of the additional carbon, the inventors have not observed that it forms otherwise than on the external surface of nanotubes, that is to say between the nanotubes with the method according to the invention, and in particular it is not a case of a deposition on top of the VACNT mats; such a deposition (which has been observed under other operating conditions) impairs the specific properties of the VACNTs with a view to use thereof as electrodes in electronic and electrotechnical devices, and must be avoided.

The disorganized nature of the additional carbon can be demonstrated in the most direct way by high-resolution transmission electron microscopy (TEM), since this technique makes it possible to see directly the graphitic (or "graphenic") regions of this additional carbon (see FIG. 4, discussed in detail in the section "Examples") According to the invention, the additional carbon is disorganized, since the graphitic regions typically have a length of between a few nanometers and a few tens of nanometers. The disorganized additional carbon is not amorphous carbon, even if it may comprise, between two graphenic or graphitic domains, more highly disorganized regions that assimilated to an amorphous region.

An estimated quantification of this disorganized additional carbon is possible, by comparing the mass of a sample deemed to be devoid of additional carbon with a sample having disorganized additional carbon. The presence or absence of disorganized additional carbon can be demonstrated by using the three techniques discussed above. For this comparison to be valid it is necessary to take account of the diameter of the nanotubes (which determines the surface density of nanotubes): in the reference sample and the sample to be characterized, the mean diameter of the nanotubes should be as close as possible, it will then be supposed that the difference in mass between the reference sample and the sample to be characterized, corrected for the difference between the heights of the VACNT mat (mean length of the VACNTs) is due to the disorganized additional carbon. A concrete application of this method is described in the section "Examples" below.

3. Description of Supercapacitors Incorporating VACNT Mats with Disorganized Additional Carbon In order to produce a supercapacitor, it is necessary to assemble at least two electrodes separated electrically by a material that does not conduct electrons (separator and liquid electrolyte). This step is referred to as the assembly. There exist several assembly techniques, the choice of which is dependent on the characteristics desired for the supercapacitor. Those used for our products will be defined in the remainder of the document.

For any assembly to be optimal, it is necessary to ensure that there is correct balancing of the negative and positive electrode or electrodes: that is to say the quantities of charge $Q_i$ should be as high as possible and equal for the two types of electrode according to the electrochemical parameters of the system sought ($\Delta E_{syst}$). The balancing follows the equation:

$$\Delta E_- \times C_{m-} \times m_- = \Delta E_+ \times C_{m+} \times m_+$$

where:

$\Delta E_i$ designates the operating voltage range, $C_{mi}$ designates the capacitance per unit mass, and $m_i$ designates the mass of the electrode i.

As the positive and negative electrodes must be facing each other, the surfaces of the electrodes must be identical or almost identical. The mass of active material of the electrodes is therefore a function of the thickness and density of the composite film and of the corresponding capacitance on the voltage region studied.

For the assembly, the separator may typically be a porous membrane with a cellulosic base, based on polyethylene or polypropylene (Nafion®, Celgard®), etc.), or made from glass fiber. In order to obtain a good power value of the supercapacitor, it is preferred to use porous-membrane separators with a liquid electrolyte.

According to the invention, the assembly may be symmetrical or asymmetric. In a symmetrical system, the negative electrode has an identical (or almost identical) nature and mass to those of the positive electrode. On the other hand, for an asymmetric system, the negative electrode has a nature or mass different from the positive electrode. Preferably, the two electrodes are based on VACNT; the capacitances thereof may be identical or different. If only one electrode comprises VACNTs, the other may be made from activated carbon for example.

In order to obtain a maximum capacitance per unit volume (at a desired capacitance of the system), it is necessary to maximize the geometric surface of contact between the negative electrodes and the positive electrodes, while minimizing the volume. For this purpose two different types of assembly may be chosen: either stacking of the electrodes (which involves welding common to the electrodes with the same polarity), or the winding of the positive and negative electrodes on one or two axes forming either a cylindrical system or a coiled prismatic system.

Once the assembly of the electrodes has been carried out, the system must be encapsulated. The electrodes and the separator are typically placed in a sealed enclosure, capable of accommodating said liquid electrolyte. This enclosure may be selected in particular from the group consisting of plastic pouches, rigid polymer shells, shells made from sheet metal coated on the inside by an electrically insulating film, ceramic shells or glass shells.

Figure 12A:
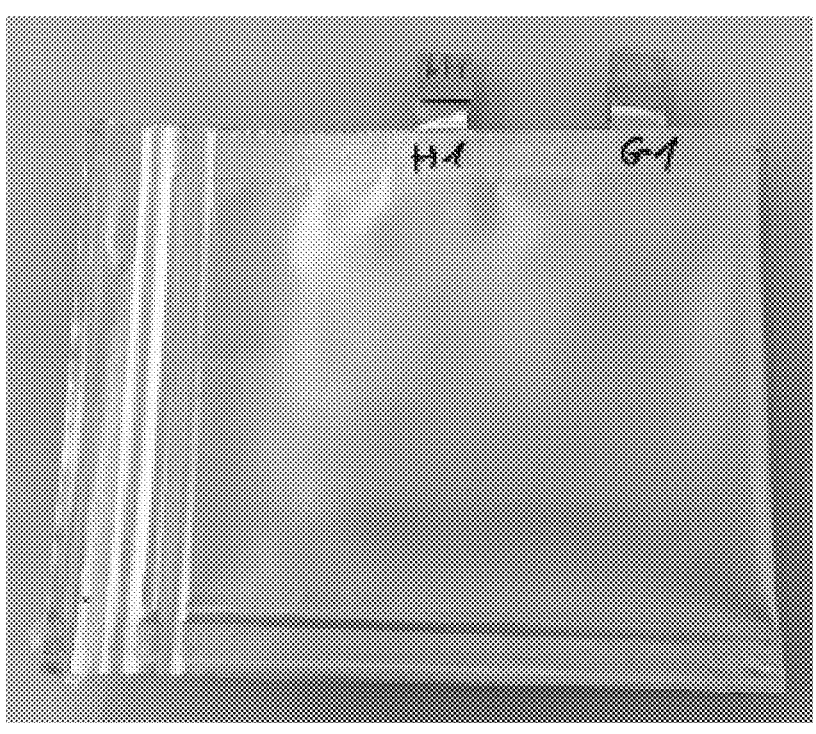
Figure 12B:
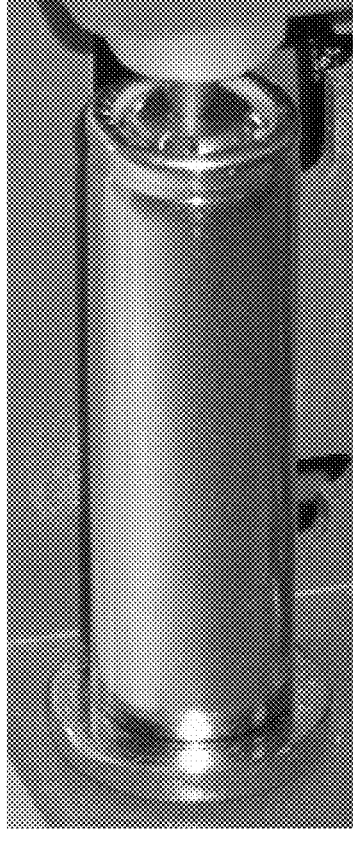

This step therefore comprises inserting the assembly consisting of electrodes and separators in an encapsulation enclosure (rigid casing, flexible pouch, cylindrical battery with a metal wall, button battery, for example), electrically connecting the electrodes to the terminals of the casing, adding and diffusing the electrolyte in the separators and electrodes, and finally sealing said enclosure. For certain types of casing (in particular casings with a metal wall) it may be necessary to isolate the casing from external contact by adding an electrically insulating cladding. FIGS. 11 and 12(a)-12(b) shows three types of enclosure that can be used in the context of the invention: the enclosure of the button battery type (FIG. 11), the enclosure of the pouch type (FIG. 12(a)), and the enclosure of the cylindrical battery type (FIG. 12(b)).

The electrolytes for cycling supercapacitors used are liquid electrolytes. It is possible in particular to use an electrolytic solution containing, as solvent, a protic solvent or an aprotic solvent, or an ionic liquid, which may be protic or aprotic.

"Protic solvent" means, in the context of the present invention, a solvent that comprises at least one hydrogen atom capable of being released in the form of a proton. The protic solvent is advantageously chosen from the group consisting of water, deionized water, distilled water, acidified or basic, acetic acid, hydroxylated solvents such as methanol and ethanol, liquid glycols with a low molecular weight such as ethylene glycol, and mixtures thereof.

"Aprotic solvent" means. In the context of the present invention, a solvent that is not capable of releasing a proton or accepting one under non-extreme conditions. The aprotic solvent is advantageously chosen from halogenated alkanes such as dichloromethane; dimethylformamide (DMF), ketones such acetone or 2-butanone; acetonitrile; tetrahydrofuran (THF); N-methylpyrrolidone (NMP); dimethyl sulfoxide (DMSO) and mixtures thereof; propylene carbonate, ethylene carbonate, dimethylcarbonate and mixtures thereof, or lactones (such as γ-butyrolactone).

In addition, the solvent that can be used in the context of the present invention may be a mixture of at least one protic solvent with at least one aprotic solvent.

The electrolytic solution that can be used in the context of the present invention comprises, in addition to a solvent as defined, an electrolyte in the form of a salt dissolved in the solvent. The anion of this salt may be chosen from inorganic ions such as $F^-$, $Br^-$, $Cl^-$, $I$, $HCO_3^-$, $H_2PO_4^-$, $Cr_2O_4^{3-}$, $BF^{4-}$, $PF_6^-$, or $N(CN)_2^-$; organic ions (described below); polymeric anions and biological anions. The cation of this salt may be a metal cation such as $Li^+$, $Na^+$, $Mg^{2+}$, $Cu^{2+}$, $Zn^{2+}$ and $Al^{3+}$ or organic cations. Among the organic anions mentioned above, mention can be made in particular of $RSO_3^-$, $RCOO^-$ (where R is an alkyl or phenyl group, possibly substituted); $(CF_3)_2PF_4$, $(CF_3)_3PF_3$, $(CF_3)_4PF_2^-$, $(CF_3)_5PF^-$, $(CF_3)_6P^-$, $(CF_2SO_3^-)2$, $(CF_2CF_2SO_3^-)_2$, $(CF_3SO_2^-)_2N^-$, $(CF_3CF_2(CF_3)_2CO^-$, $(CF_3SO_2^-)_2CH^-$, $(SF_5)_3C^-$, $(CF_3SO_2SO_2)_3C^-$, $[O(CF_3)_2C_2(CF_3)_2O]_2PO$, $CF_3(CF_2)SO_3^-$, bis(trifluoro-methanesulfonyl)amide, bis(fluorosulfonyl) amide.

Any ionic liquid (protic or aprotic) containing a cation associated with an anion can be used in the context of the present invention. Among these aprotic ionic liquids, mention can be made of ionic liquids containing quaternary ammonium ions such as the ions 1-ethyl-3-methyl imidazolium, 1-methyl-3-propyl imidazolium, 1-methyl-3-isopropyl imidazolium, 1-butyl-3-methyl imidazolium, 1-ethyl-2,3-dimethyl imidazolium, 1-ethyl-3,4-dimethyl imidazolium, N-propyl pyridinium, N-butyl pyridinium, N-tert-butyl pyridinium, N-tert-butanol-pentyl pyridinium, N-methyl-N-propylpyrrolidinium, N-butyl-N-methyl-pyrrolidinium, N-methyl-N-pentyl pyrrolidinium, N-propoxyethyl-N-methyl pyrrolidinium, N-methyl-N-propyl piperidinium, N-methyl-N-isopropyl piperidinium, N-butyl-N-methyl piperidinium, N—N-isobutylmethyl piperidinium, N-sec-butyl-N-methyl piperidinium, N-methoxy-N-ethylmethyl piperidinium, and N-ethoxyethyl-N-methyl piperidinium. Mention can also be made of the ionic liquids containing ammonium ions such as the ions butyl-N—N-trimethyl ammonium, N-ethyl-N,N-dimethyl-N-propyl ammonium, N-butyl-N-ethyl-N,N-dimethyl ammonium, and N,N,N-trimethyl ammonium, associated with any anion such as the tetrafluoroborate ($BF_4^-$), hexafluorophosphate ($PF_6^-$), bis (trifluoromethane-sulfonyl)amide ($TFSI^-$) or bis (fluorosulfonyl)amide (FSI) ions.

An organic electrolyte that is particularly suitable in the context of the present invention is tetraethylammonium tetrafluoroborate (preferably at approximately 1 mol/liter) in acetonitrile.

In a particular embodiment, an electrolyte is used that comprises an ionic liquid comprising at least one cation selected from the group consisting of the derivatives of pyridine, pyridazine, pyrimidine, pyrazine, imidazole, pyrazole, thiazole, oxazole, triazole, ammonium, pyrrolidine, pyrroline, pyrrole, and piperidine, and at least one anion selected from the group consisting of $F^-$, $Cl^-$, $Br^-$, $I^-$, $NO_3^-$, $N(CN)_2^-$, $BF_4^-$, $ClO_4^-$, $PF_6^-$, $RSO_3^-$, $RCOO^-$, where R is an alkyl or phenyl group, $(CF_3)_2PF_4^-$, $(CF_3)_3PF_3$, $(CF_3)_4PF_2^-$, $(CF_3)_5PF^-$, $(CF_3)_6P^-$, $(CF_2SO_3^-)_2$, $(CF_2CF_2SO_3^-)_2$, $(CF_3SO_2^-)_2N^-$, $(CF_3CF_2(CF_3)_2CO^-$, $(CF_3SO_2^-)_2CH^-$, $(SF_5)_3C$, $(CF_3SO_2)_3C$, $[O(CF_3)_2C_2(CF_3)_2O]_2PO^-$, $CF_3(CF_2)_7SO_3^-$, 1-ethyl-3-methylimidazole, bis(trifluoro-methylsulfonyl)imide ([EMIM][Tf$_2$M]).

Once the electrolyte is added and diffused in the electrode/separator assembly, the enclosure is sealed either by thermoplastic bonding (in the case of pouch cells) or by mechanical sealing (metal and plastic covering or metallic welding, as is the case with button batteries and cylindrical casings. For some types of casing (cylindrical battery with metal body, for example), it may be necessary to isolate the casing from external contact (for reasons of electrical safety) by adding an electrically insulating cladding, either adhesive or heat shrinking.

In general terms, the method for manufacturing a supercapacitor according to the invention comprises the following steps:

1. Cropping the electrodes and separators according to the type of assembly and encapsulation casing,
2. Welding (preferably ultrasonic or by laser) of current collectors (tab) on the electrodes,
3. Assembly of electrodes and separators,
4. Welding (preferably ultrasonic or by laser) of the current collectors (tab) of the electrodes to the terminals of the enclosure (for example to the lid of the casing),
5. Fitting of the electrode/separator assembly in the casing (knowing that steps 4 and 5 may be reversed),
6. Adding and diffusion of the electrolyte in the electrode/separator assembly,
7. Sealing of the enclosure.

The supercapacitor according to the invention comprises at least one electrode, and preferably all the electrodes, made from VACNT having disorganized additional carbon. The inventors have found that the use of such electrodes leads to a significant increase in capacitance, compared with a supercapacitor having a similar electrode made from VACNT but without disorganized additional carbon. Here "similar electrode" means an electrode made from VACNT with the same mean length and the same surface density of the nanotubes, the only difference being the presence or absence of disorganized additional carbon. This increase is significant if the composite comprises at least 10% disorganized additional carbon, based on the mass of the carbon nanotubes; preferably this content is at least 30%, and even more preferentially at least 50%. The increase is no longer observed beyond 90%, and preferably 80% is not exceeded.

According to the invention it is possible to manufacture supercapacitors capable of storing an energy of at least. 0.8 $Wh/m^2$, preferably at least 1 $Wh/m^2$ and even more preferentially at least 2 $Wh/m^2$ for a power of between 0.01 and 1 $kW/m^2$.

EXAMPLES

The following examples illustrate embodiments of the invention for enabling a person skilled in the art to execute the invention. They also describe comparative embodiments.

1. Production and Characterization of the VACNT Mats

VACNT mats are produced in three different types of reactor, by continuous pulsed injection of the catalyst precursor (ferrocene dissolved in toluene), the carbon source being acetylene. The principle of this technique is described in the document WO 2004/000727 (Commissariat à l'Energie Atomique et aux Energies Alternatives). A first reactor (reference "Furnace 1") was a tubular furnace comprising, in a heated enclosure, a quarts tube with a circular cross-section of 330 $mm^2$ in which the substrate was situated. A second reactor (reference "Furnace 2") was a tubular furnace comprising, in a heated enclosure, a quartz tube with a circular cross-section of 1917 $mm^2$ in which the substrate was situated. These two furnaces were batch furnaces. The third reactor (reference "Pilot") was a continuous reactor in which a metal belt can travel across a rectangular cross-section of 9525 $mm^2$; this reactor was used here in static mode (i.e. without travel, with a reaction zone of 1000 mm×300 mm.

The main parameters of the syntheses and results are set out in table 1 below. FIG. 1 shows schematically the batch reactor ("Furnace 1" and "Furnace 2"). The optimal (homogeneous) growth zone was approximately 170 mm×15 mm for Furnace 1, and approximately 300 mm×30 mm for Furnace 2. In this optimal growth zone it is possible to dispose various types of substrate, such as an aluminum strip or aluminum pellets.

Unless otherwise stated, all the results given in the "Examples" part relate to the batch furnaces.

TABLE 1

| Reactor and sample reference | F1 NI-836 | F1 NI-766 | F1 NI-842 | F2 NGI-1067 | F2 NGI-1050 | P S01 R170 7041 C1C3 | F2 NGI-1086 | F2 NGI-1088 | F2 NGI-1085 | F2 NGI-1081 | F2 NGI-1113 | F2 NGI-1091 | F2 NGI-1119 | F2 NGI-1045 | F2 NGI-1046 | F2 NGI-1057 | F2 NGI-1118 | F2 NGI-1051 | F2 NGI-1060 |
|---|---|---|---|---|---|---|---|---|---|---|---|---|---|---|---|---|---|---|---|
| Parameters of syntheses of VACNT on aluminum substrate | | | | | | | | | | | | | | | | | | | |
| Ar flow (l/min) | 0.150 | 0.080 | 0.020 | 0.250 | 0.275 | 1.200 | 0.300 | | | 0.15 | | | 0.12 | | | 0.2 | 0.9 | 0.3 | 0.15 |
| $H_2$ flow (l/min) | 0.020 | 0.060 | 0.020 | 0.100 | 0.75 | 0.900 | 0.05 | | | 0.15 | | | 0.09 | | | 0.15 | 0.12 | 0.05 | 0.15 |
| $C_2H_2$ flow (l/min) | 0.030 | 0.060 | 0.027 | 0.150 | 0.150 | 0.900 | 0.150 | | | 0.2 | | | 0.09 | | | 0.15 | 0.18 | 0.15 | 0.20 |
| Total flow (l/min) | 0.200 | 0.200 | 0.067 | 0.500 | 0.500 | 3.00 | 0.500 | | | | | | 0.300 | | | 0.50 | 1.20 | 0.500 | |
| Ratio of cases: $Ar/H_2/C_2H_2$ | 75/10/15 | 40/30/30 | 30/30/40 | 50/20/30 | 55/15/30 | 40/30/30 | 60/10/30 | | | 30/30/40 | | | 40/30/30 | | | 75/10/15 | 60/10/30 | 30/30/40 | |
| Speed of passage at 20° C. (mm/s) | 10.1 | 16.6 | 3.38 | 4.4 | 4.4 | 5.25 | 4.4 | | | | | | 2.6 | | | 4.4 | 10.4 | 4.4 | |
| Duration of synthesis (min) | 27.5 | 20 | 30 | 30 | 30 | 60 | 10 | 15 | 20 | 30 | 7 | 30 | 45 | 20 | 30 | 30 | 20 | 30 | 30 |
| Mass of liquid injected (mg/min) | 15.3 | 25 | 73 | 53.3 | 76.7 | 80 | 70 | 73.3 | 65 | 53.3 | 54.3 | 63.3 | 57.8 | 70 | 70 | 100 | 52.5 | 53.3 | 100 |
| Fe/C ratio (%) | 1.01 | 1.00 | 0.62 | 0.77 | 1.01 | 1.44 | 0.94 | 0.98 | 0.89 | 0.77 | 0.62 | 0.70 | 0.65 | 1.33 | 1.33 | 1.2 | 0.66 | 0.77 | 0.99 |
| Disorganized additional carbon (%) | 0 | 0 | 0 | 65 | 56 | 58 | 13 | 34 | 62 | 66 | 56 | 71 | 73 | 28 | 46 | 50 | 61 | 66 | 64 |
| Total volume $C_2H_2$ (l) | 0.83 | 1.20 | 0.81 | 4.50 | 4.50 | 54 | 1.50 | 2.25 | 3.00 | 4.50 | 1.40 | 6.00 | 9.00 | 1.80 | 2.70 | 4.50 | 3.60 | 4.50 | 6.00 |

TABLE 1-continued

| | | | | | | Parameters of syntheses of VACNT on aluminum substrate | | | | | | | | | | | | |
| Reactor and sample reference | F1 NI-836 | F1 NI-766 | F1 NI-842 | F2 NGI-1067 | F2 NGI-1050 | P S01 R170 7041 C1C3 | F2 NGI-1086 | F2 NGI-1088 | F2 NGI-1085 | F2 NGI-1081 | F2 NGI-1113 | F2 NGI-1091 | F2 NGI-1119 | F2 NGI-1045 | F2 NGI-1046 | F2 NGI-1057 | F2 NGI-1118 | F2 NGI-1051 | F2 NGI-1060 |
|---|---|---|---|---|---|---|---|---|---|---|---|---|---|---|---|---|---|---|---|
| Total volume $C_2H_2$ standardized (ml/mm$^2$) | 2.52 | 3.64 | 2.45 | 2.35 | 2.35 | 5.67 | 0.78 | 1.17 | 1.56 | 2.35 | 0.73 | 3.13 | 4.69 | 0.94 | 1.41 | 2.35 | 1.88 | 2.35 | 3.13 |
| Substrate | | AlMg 1 | | | | AlMn 1 | | | | | | AlMg 1 | | | | | | | |

All these syntheses were carried out at a set temperature of 615° C., at atmosphere pressure.
The toluene/ferrocene concentration was 10% by mass for all these syntheses.
The speed of passage at 20° C. refers to the cross-section of the quartz tube without substrate carrier.

Figure 2A:
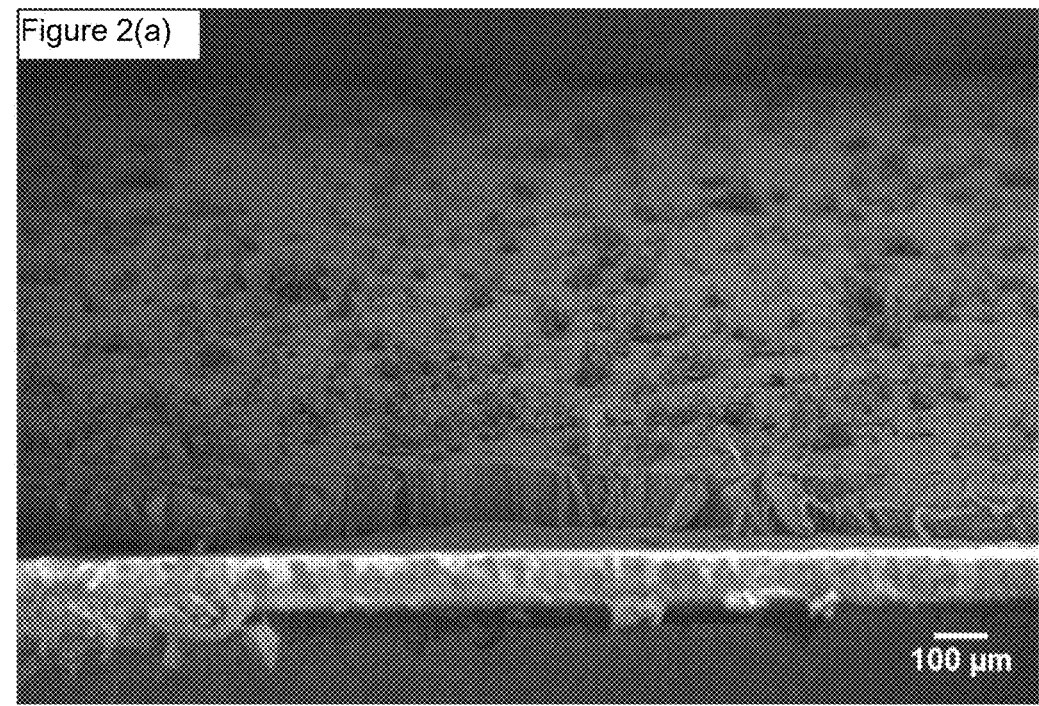
FIGS. 2(a)-2(d) show images obtained by scanning electron microscopy (SEM), (FIGS. 2(a), (b) and (c)) and by transmission electron microscopy (TEM, FIG. 2(d)) on regions of the sample NI-836, at different magnifications. The length of the bar at the bottom of each image indicates the length of approximately 100 µm (FIG. 2(a)), of approximately 30 µm (FIG. 2(b)), of approximately 100 nm (FIG. 2(c)), and of approximately 30 nm (FIG. 2(d)).
Figure 2B:
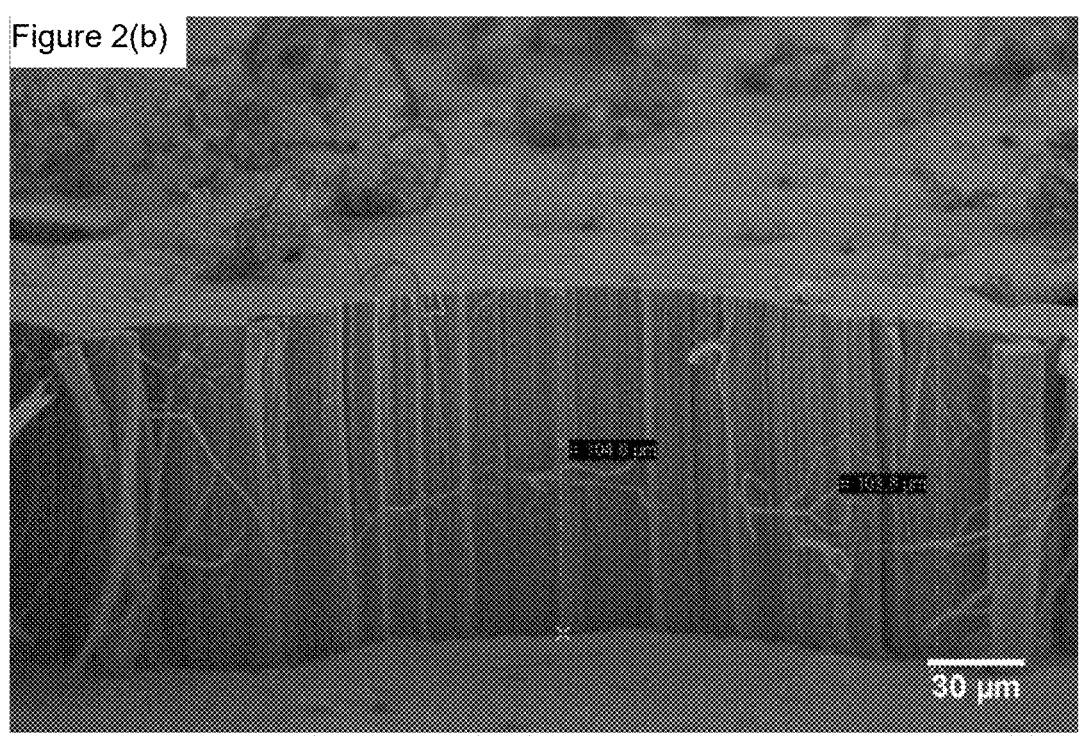
Figure 2C:
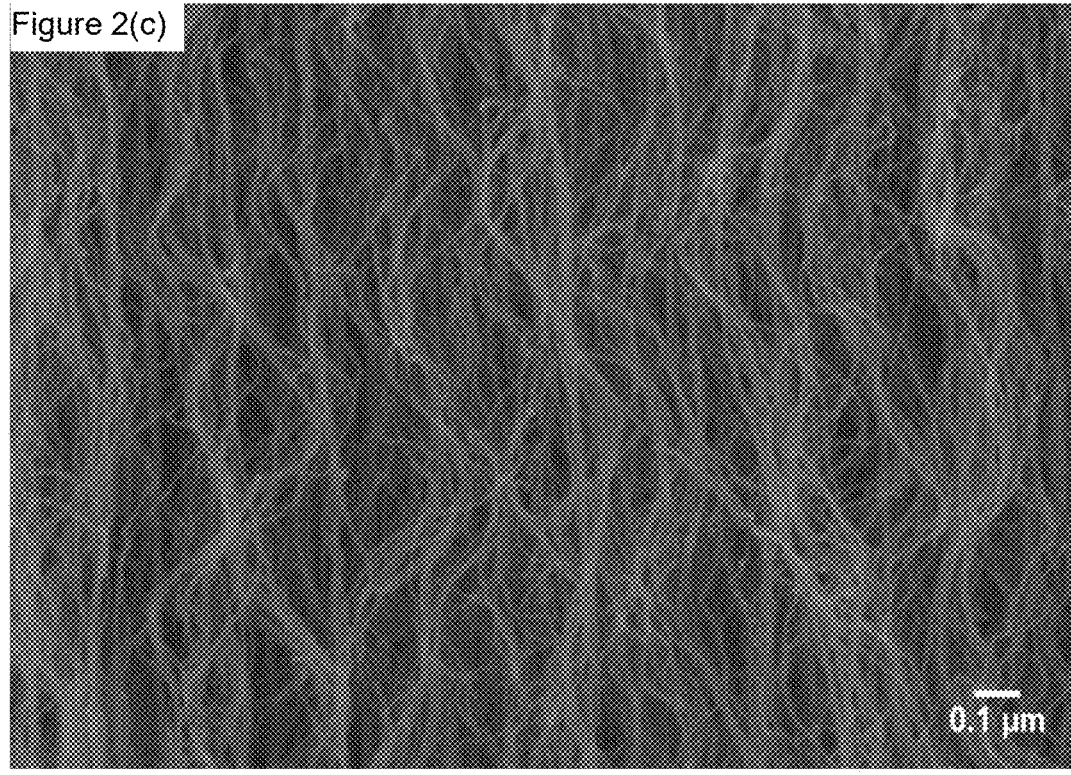
Figure 2D:
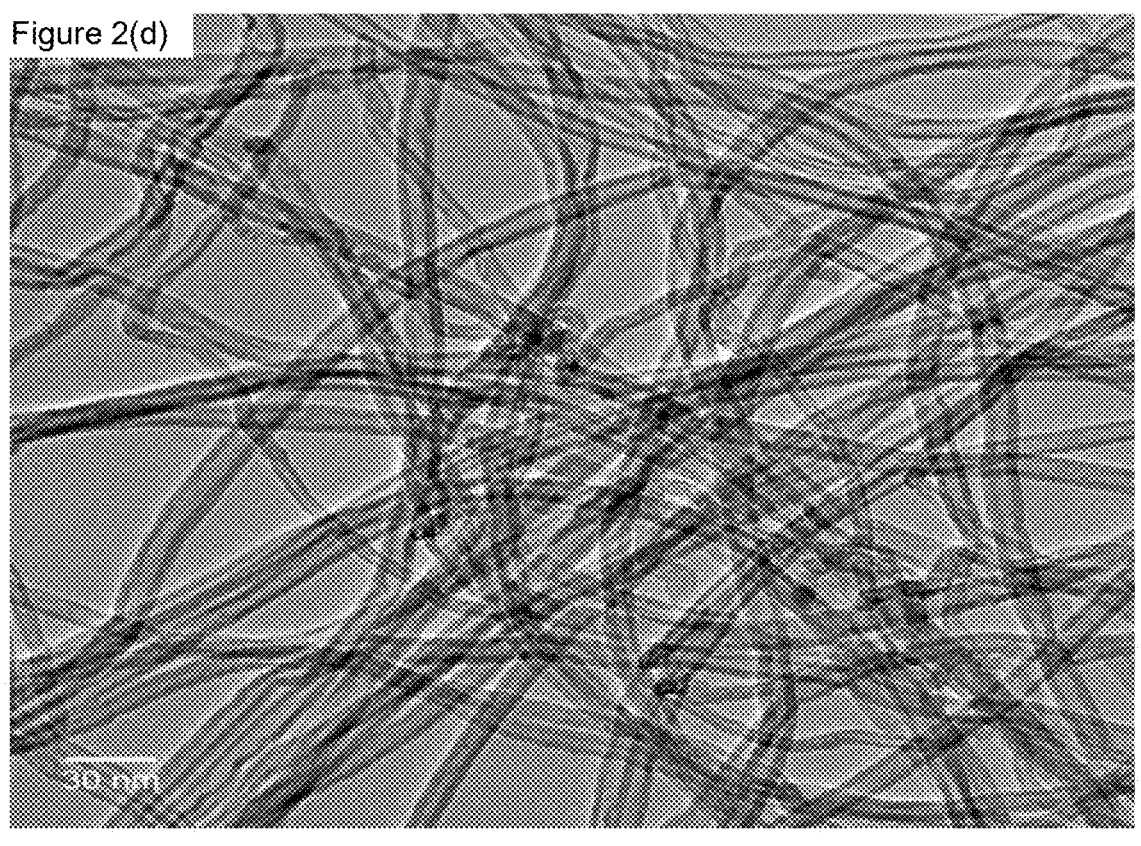
Figure 3A:
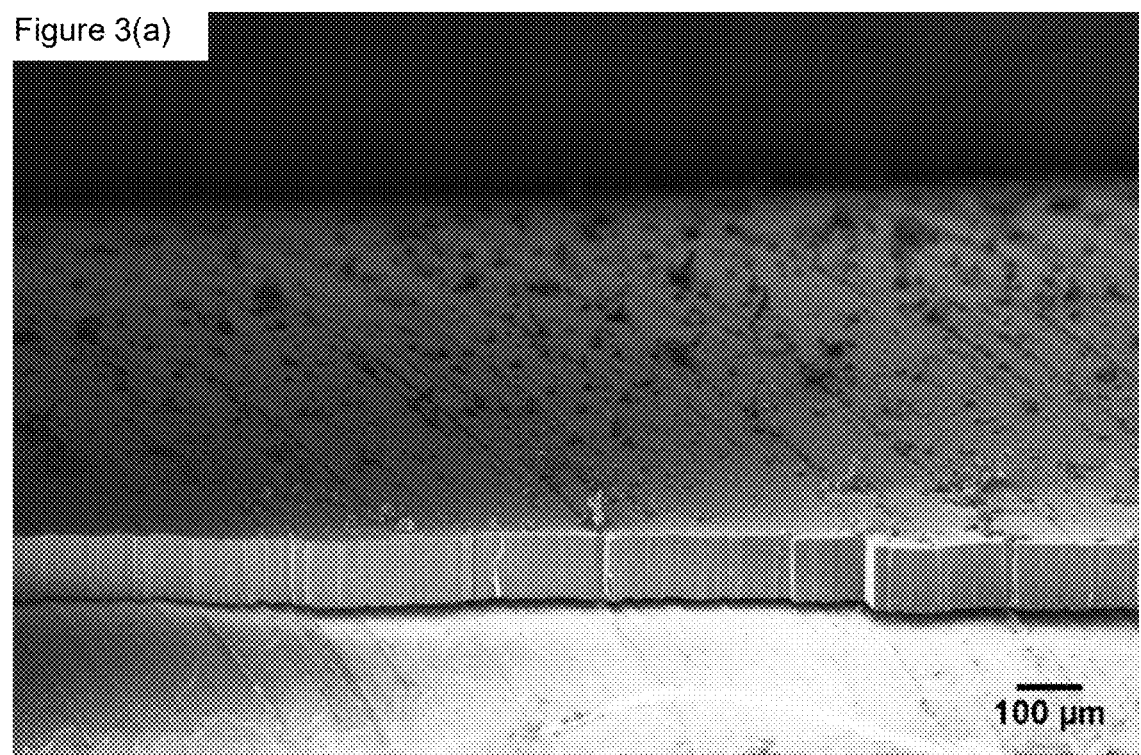
Figure 3B:
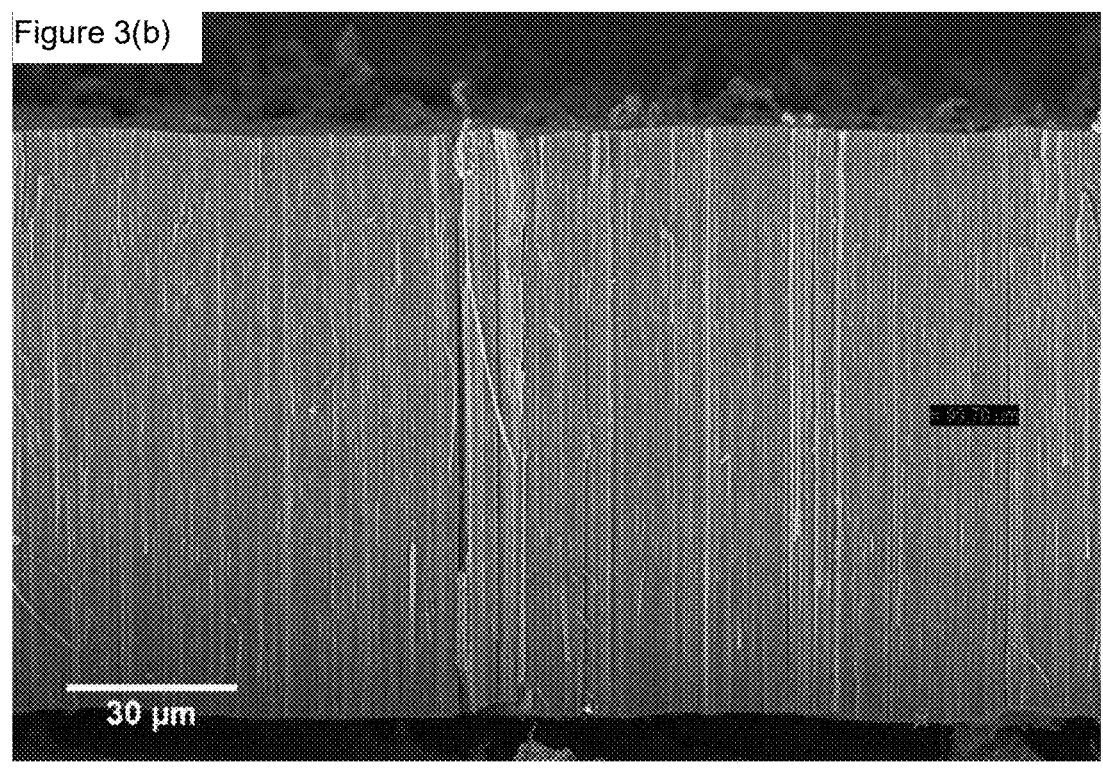

FIGS. 2 and 3 show examples of growths of VACNT on an aluminum alloy (AlMg1) substrate for two process conditions. In both cases, the carbon nanotubes are in the form of vertically aligned mats. More precisely, FIG. 2 shows SEM micrographs with four different magnifications of the NI-836 sample. It will be noted in FIG. 2(c) that it is possible to distinguish the individual nanotubes: the space between two tubes is visible.

Figure 3C:
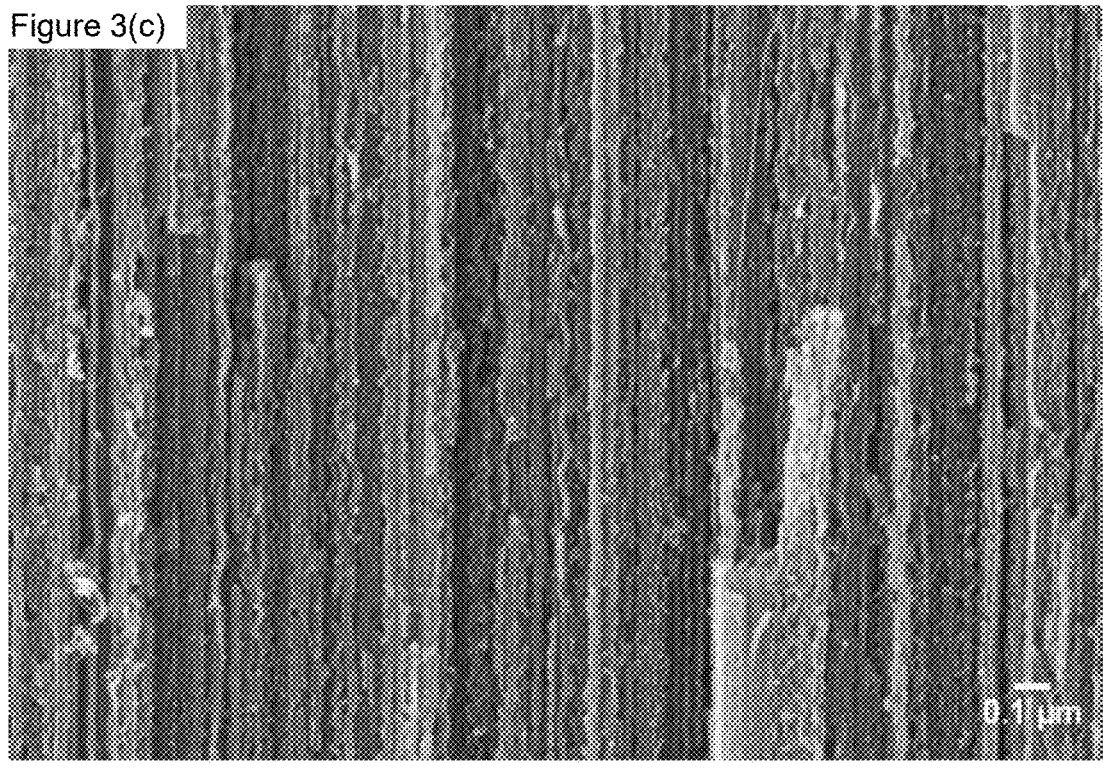

FIG. 3 shows SEM micrographs with three different magnifications of the NGI-1067 sample. It will be noted in FIG. 3(c) that the nanotubes have a surface deposit of additional carbon in the intertube space making it difficult to observe carbon nanotubes individually. FIG. 3(d), obtained by TEM with higher magnification, confirms the presence of such a deposit on the external surface of the nanotubes; such a surface deposit is not observed in FIG. 2(d), obtained at the same magnification on a sample prepared in a different way (see the examples).

Figure 4B:
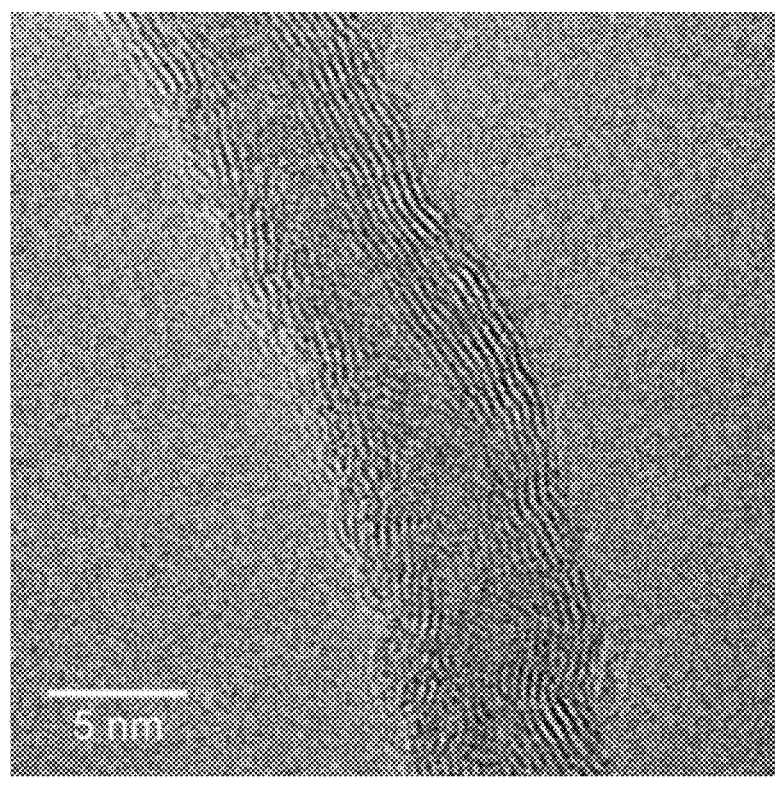

FIG. 4 shows the additional carbon that has been characterized in greater detail by high-resolution transmission electron microscopy (HR-TEM), see FIG. 4(a). FIG. 4(b) shows the structure of an individual carbon nanotube, which reveals the presence of graphene planes, each being more or less well organized structurally as testified to by their tortuousness, and all these planes having a long-distance organization.

Figure 4C:
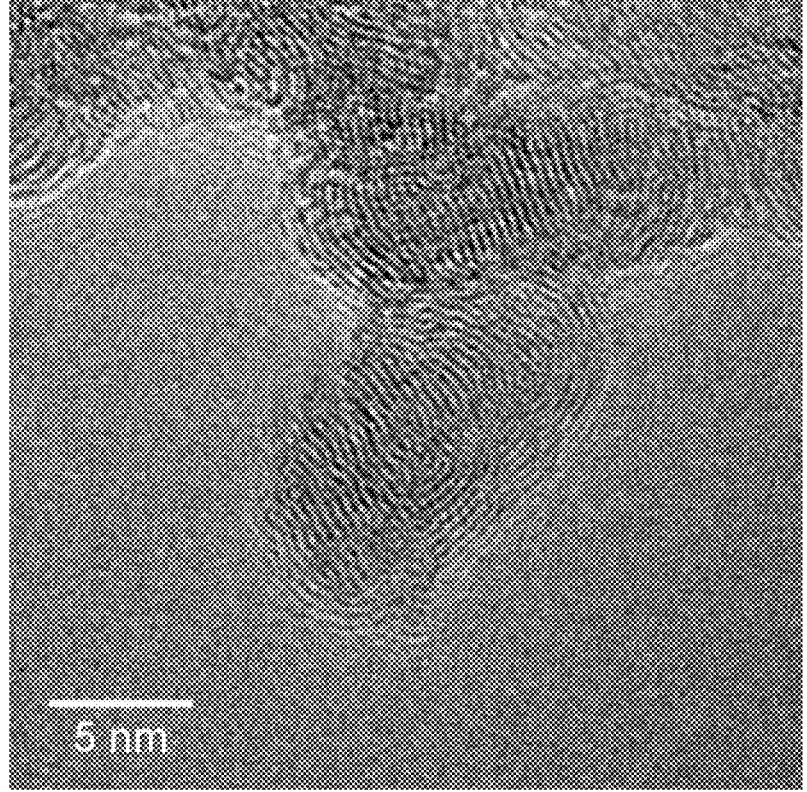

FIGS. 4(c) and 4(d) show that the additional carbon is composed of a plurality of sets of a small number of stacked graphene planes (also referred to as: base structure units (BSUs) BSUs being randomly distributed between them, which reflects a weak long-distance organization. Thus this additional carbon may be termed disorganized carbon having a degree of semigraphitic organization, unlike a disorganized carbon, which would be completely amorphous and which would therefore not comprise any graphitized unit, that is to say no BSU.

The decomposition of VACNT by gravimetric thermal analysis (GTA) carried out in dry air with a ramp of 10° C./min was characterized, in order to attempt to determine the quantity of additional carbon. A typical curve is shown in FIG. 5 for two samples (references 1 and 2) prepared in batch mode which presents different proportions of disorganized additional carbon: the proportion of sample 1 is greater than that of sample 2.

It is found that the two curves reveal only a single continuous loss of mass but that the temperature of the start of thermal degradation is different according to the sample. The temperature at the start of decomposition is lower for sample 1, which has the higher level of disorganized additional carbon, than for sample 2. In addition, it is found that the proportion of iron in the two samples is very close: 1.74% for sample 1 and 1.86% for sample 2. It is therefore possible to eliminate the effect of the catalytic decomposition by iron on the difference in temperature at the start of degradation. It is therefore possible to hypothesize that the temperature at the start of decomposition is related to the proportion of disorganized additional carbon. However, the GTA-in-air curve does not make it possible to identify the presence of two distinct losses of mass: one which would relate to the decomposition of the disorganized carbon and the other that would relate to the decomposition of the carbon of the carbon nanotubes; this matches the works of Yusada (cited above), which show that a disorganized carbon having a degree of semigraphitic organization and present in the nanotube mats does not cause any specific mass loss when its GTA-in-air curve is recorded.

Figure 6A:
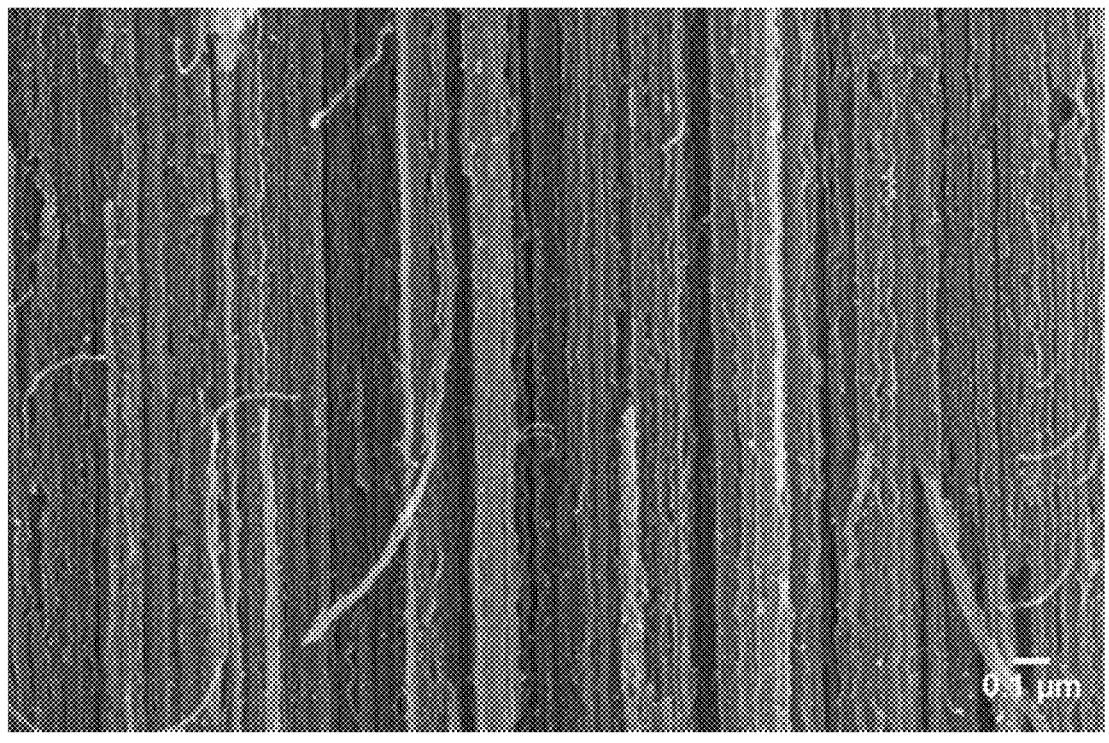
FIGS. 6(a)-6(b) show two SEM micrographs of the samples used in the measurement in FIG. 5: sample 1 (FIG. 6(a)) and sample 2 (FIG. 6(b)). The proportion of disorganized additional carbon is greater in sample 1 compared with sample 2.
Figure 6B:
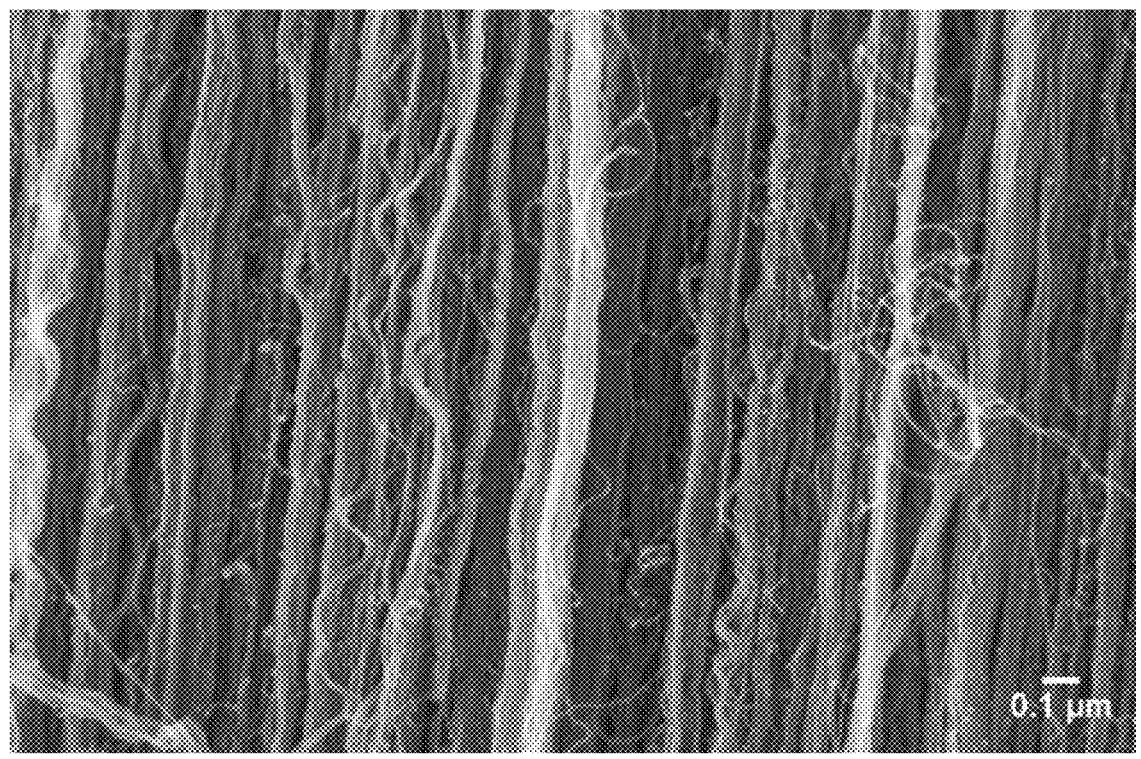

FIG. 6 shows SEM micrographs of sample 1 (FIG. 6(a)) and sample 2 (FIG. 6(b)). The high level of disorganized additional carbon of sample 1 compared with sample 2, where the intertube space can be distinguished more easily, can be seen directly.

The estimation of the proportion of disorganized additional carbon is now described. It should be noted that, under the experimental conditions studied, no detectable quantity of disorganized additional carbon was found for a total volume of $C_2H_2$ delivered during the synthesis reaction of less than 1.3 liters; for these samples the zero value was assigned to the proportion of disorganized additional carbon.

According to the invention, the proportion of disorganized additional carbon is estimated by a difference in mass between a reference sample without any disorganized additional carbon and a sample with disorganized additional carbon. The reference sample is a sample not containing any disorganized additional carbon, which was checked by SEM and TEM as shown in FIGS. 2(c) and 2(d). This sample has a mass per unit area of 1.11 mg/cm$^2$ and a VACNT height of 59 μm. The mean outside diameter of the nanotubes containing the sample is around 9 nm and the mean inside diameter is around 4 nm. For a sample of VACNT still without disorganized additional carbon but thicker and for which the VACNTs have the same diameter, it is possible to calculate the mass per unit area that is simply proportional to the ratio between the heights of the two VACNT samples. This calculation is realistic since it is checked that the mean outside diameter of the carbon nanotubes, and therefore the density of carbon nanotubes, is comparable for the two samples. This is because the outside diameter of the carbon nanotubes is accepted as being equivalent to the diameter of the catalytic particles present at the base of the carbon nanotubes and serving for the growth thereof. However, the case of the synthesis method used in the context of the present invention, the formation of the catalytic particles results from a homogeneous germination mechanism in gaseous phase and, having regard to the supersaturation with iron vapor, the density of carbon nanotubes reached is always maximal and depends on the size of the catalytic particles (see Castro et al. Carbon 61, 2013, 581-594). Thus, for two different samples synthesized under identical temperature conditions, if it is verified that the diameter of the carbon nanotubes is equivalent, it can be assumed that the density of carbon nanotubes in the sample is equivalent.

Let us now take the case of a VACNT mat containing disorganized additional carbon observed under SEM and TEM as shown in FIGS. 4(b) and 4(d). It is first checked that the diameter of the nanotubes in this sample is comparable with that of the nanotubes in the sample without disorganized additional carbon, which makes it possible to validate the hypothesis that the VACNT mats with or without disorganized additional carbon have a comparable density of carbon nanotubes. Thus the mass per unit area measured on the mat having disorganized additional carbon results from the sum of the mass per unit area of the mat without disorganized additional carbon and the mass per surface area of the disorganized additional carbon. Knowing the height of the mat with disorganized additional carbon, it is possible to calculate the mass per unit area that this same mat would have without disorganized additional carbon (see previous paragraph), which is deduced from the mass per unit area of the mat with disorganized additional carbon, which makes it possible to discover the mass of disorganized additional carbon.

The calculation uses the following parameters:

$M_{ref}$=1.11 (mg/cm$^2$): Mass per unit area of the reference VACNT mat without disorganized additional carbon Outside diameter of the CNTs=9 nm $h_{ref}$=59 μm: Height of the reference VACNT mat measured $M_{mes}$: Mass per unit area (mg/cm$^2$) of the VACNT mat measured $h_{mes}$: Height (μm) of the VACNT mat measured $M_{est}$: Estimated mass per unit area of the VACNT mat (mg/cm$^2$), if there had not been any disorganized additional carbon % disorganized C: Estimated percentage of disorganized additional carbon in the VACNT mat.

The proportion of disorganized additional carbon is estimated from the following formulae:

$$M_{est}=(M_{ref} \times h_{mes})/h_{ref}$$

$$\% \text{ disorganized } C=(M_{mes}-M_{est})/M_{mes} \times 100$$

For these measurements and calculations, no account is taken of the substrate on which the VACNTs are deposited. The results are set out in table 3 below.

The VACNT mats were also characterized by Raman spectroscopy with the following conditions: wavelength: 532 nm; laser power=0.2 mW; range: 800-3500 cm$^{-1}$; exposure time: 10 s; one accumulation and irradiation by the laser beam was directed onto the top surface of the mat. FIG. 7 shows a typical Raman spectrum of a VACNT sample according to the invention with 33% disorganized additional carbon. FIG. 8 shows parameters derived from the width of certain bands of the Raman spectrum for various samples of VACNT mat having a different proportion of disorganized additional carbon. More precisely, FIG. 8(a) shows the width of band D (circular dots) and the ratio of the intensities between band D3 and band G (triangular dots).

Figure 8B:
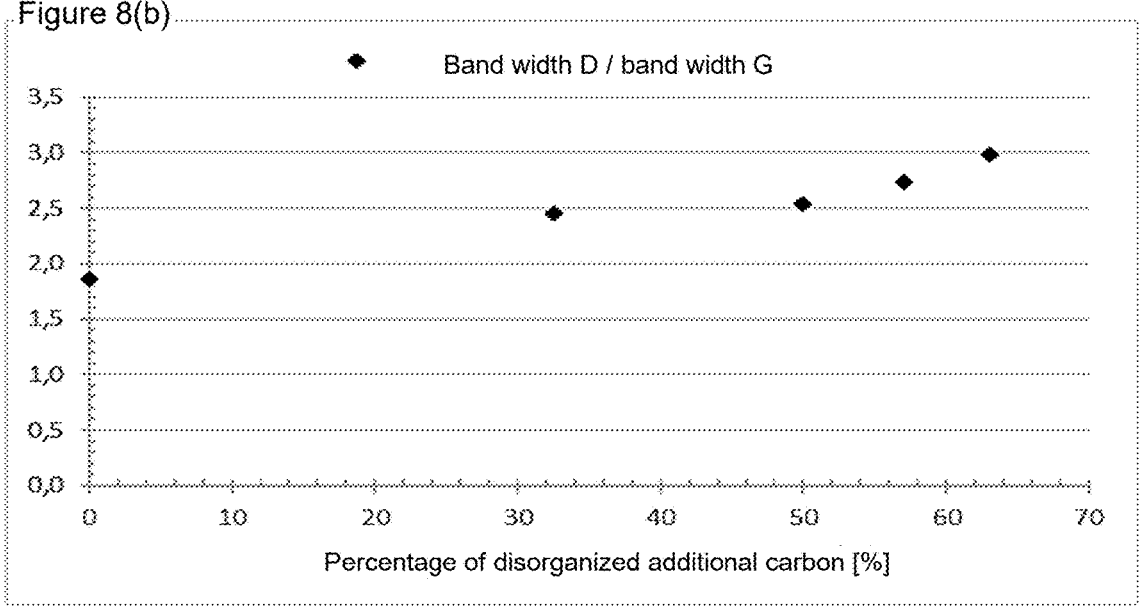

An increase of band D and of the ID3/IG ratio is observed as a function of the percentage of disorganized carbon, and in addition there is the same tendency with the ID3/IG ratio. FIG. 8(b) shows the ratio between the width of band D and the width of band G, which shows the same tendency. The various parameters such as band D; ID3/IG; ratio of the widths of bands D and G evaluated by Raman make it possible to observe the presence of disorganized additional carbon in a VACNT mat.

The specific surface area of the VACNT mats was also determined by the BET (Brunauer-Emett-Teller) technique, known to persons skilled in the art. Table 2 shows results obtained for two samples having different amounts of disorganized additional carbon. The results show a reduction in the specific surface area with the increase in the proportion of disorganized additional carbon.

TABLE 2

| Sample | Mean height VACNT (μm) | Density per unit volume (mg/cm$^3$) | % disorganized carbon | BET specific surface area (m$^2$/g) |
|---|---|---|---|---|
| NGI-1077 | 71 | 718 | 74 | 312 |
| NGI-1116 | 71 | 283 | 36 | 365 |

Figure 9:
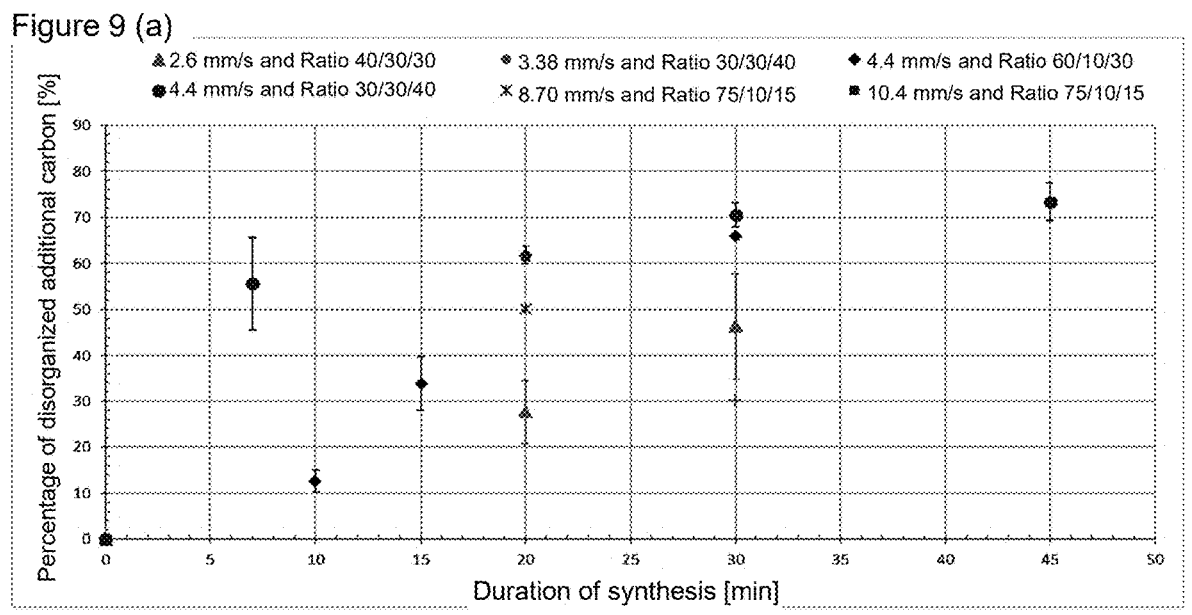
FIG. 9(*a*) shows the proportion of disorganized additional carbon as a function of the duration of the synthesis in a batch reactor, for various gas mixtures and flowrates.
Figure 9B:
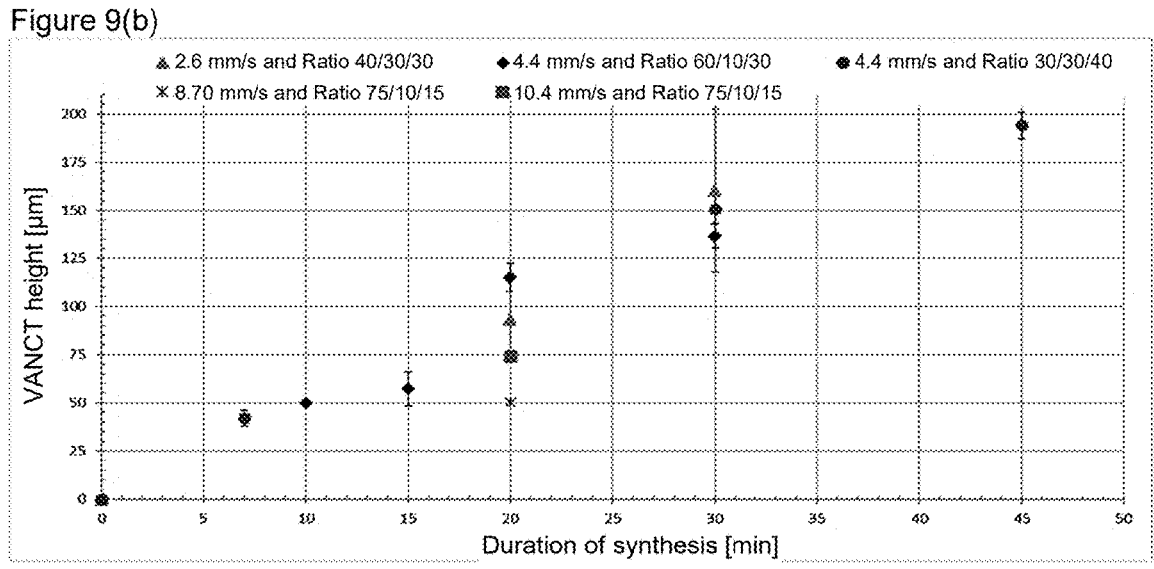

The effect of the various synthesis parameters of the method on the properties of the VACNTs obtained (and in particular on the proportion of disorganized additional carbon) was explored. All the characterizations of the mats result from a mean on the homogeneous region of the reaction furnace FIG. 9(a) shows the proportion of disorganized additional carbon as a function of the duration of synthesis in a batch reactor. Three compositions of gas flows (ratios Ar/H=2/C$_2$H$_2$) are represented: 60/10/30; 40/30/30; 30/30/40. An increase in the proportion of disorganized additional carbon with the duration is observed, whatever the speed of passage of the gas and the composition of the gas flow. FIG. 9(b) shows the height of the VACNT mats as a function of the duration of the synthesis, for the same synthesis conditions as FIG. 9(a).

In general terms the inventors find that, in a batch reactor, the proportion of disorganized additional carbon increases with the synthesis time whatever the total flowrate and the ratio of the gases. This amount increases with the hydrogen content as well as with the acetylene content. On the other hand, this amount does not depend on the total flowrate.

Figure 10A:
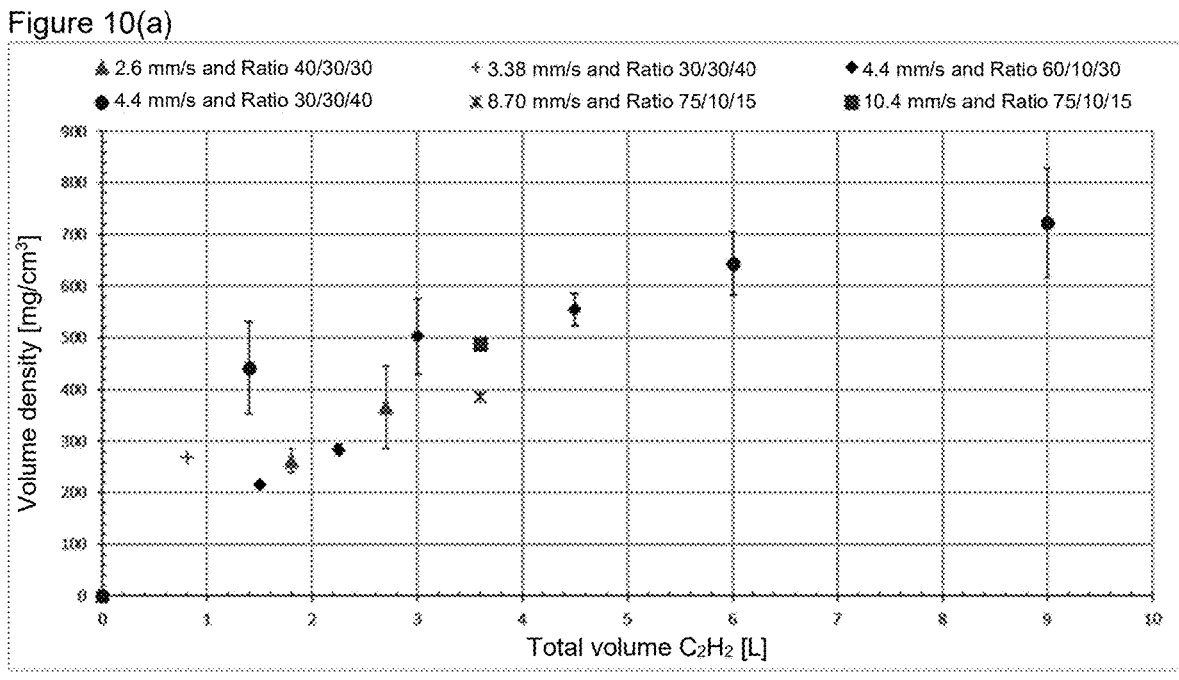
FIG. 10(*a*) shows the volume density, FIG. 10(*b*) the proportion of disorganized additional carbon, and FIG. 10(*c*) the height of VACNT mat, as a function of the total volume of acetylene injected into the reactor.

The first key parameter for controlling the proportion of disorganized additional carbon in the method according to the invention is the total volume of acetylene injected (Vol tot C2H2) in the reactor. The total volume of acetylene injected is calculated from the flow of acetylene multiplied by the duration of synthesis as in the Yasuda reference. FIG. 10(a) shows that the density per unit volume (mass per unit area multiplied by the height VANT) is highly dependent on the total volume of acetylene injected, but fairly little on the speed of passage.

Figure 10B:
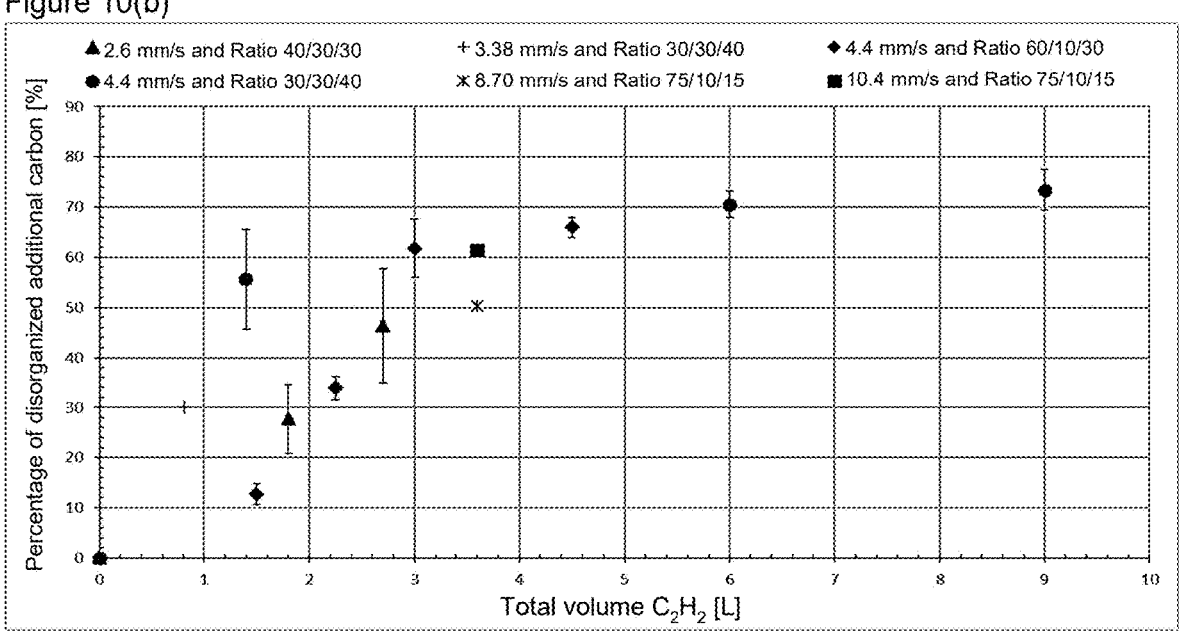

FIG. 10(b) shows that the proportion of disorganized additional carbon is highly dependent on the quantity of acetylene: the greater the quantity of acetylene, the more favorable it is for creating disorganized additional carbon. The range of total volume of C2H2 injected between zero and 10 liters makes it possible to control the proportion of disorganized additional carbon between zero and 90%. Preferentially for a range between 1.2 and 9 liters makes it possible to control the proportion of additional carbon between 10% and 80%.

Figure 10C:
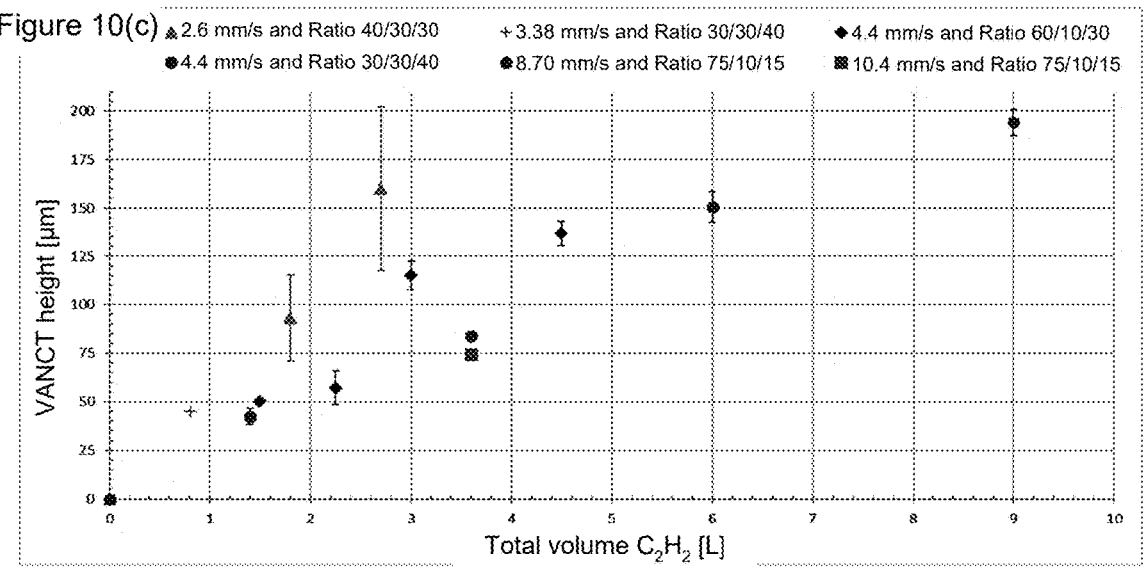

It should be noted that the height of the VACNT mat increases with the quantity of acetylene injected (FIG. 10(c)). The growth is not limited by the duration since, in the method according to the invention, the catalyst is injected almost continuously (preferably by periodic pulses very close together), which avoids the stoppage of the growth of the nanotubes through lack of catalyst. In addition, for a total C2H2 volume for example of around 3 liters, a low passage speed (for example 2.6 mm/s) makes it possible to obtain a greater speed of growth of the VACNTs. This means that the yield of the VACNT deposition reaction increases with the residence time of the reaction species in the deposition zone of the reactor. It is also observed that the formation of the disorganized additional carbon does not modify the growth of the VACNTs.

The second key parameter for controlling the proportion of disorganized additional carbon in the method according to the invention is the quantity of catalyst; if the catalyst is iron (typically provided in the form of ferrocene), a critical parameter is the Fe/C ratio. This ratio is the quantity of catalyst injected (in the case where the catalyst is iron) in the total quantity of carbon injected, knowing that this quantity of carbon injected comprises the quantity of C2H2 and the quantity of toluene. FIG. 10(d) shows that the proportion of disorganized additional carbon decreases with the increase in the Fe/C ratio for passage speeds of between 4.4 mm/s and 10.4 mm/s. If the Fe/C ratio increases, this indicates an increase in the quantity of iron injected, which favors the catalytic decomposition of the C2H2 for the growth of VACNT. For an iron content greater than 0.8%, it is possible to obtain a proportion of disorganized additional carbon greater than 50% with passage speeds of between 4.4 mm/s and 10.4 mm/s. For a proportion of iron greater than 0.8%, it is possible to obtain a proportion of disorganized additional carbon of less than 50% with passage speeds of between 2.6 mm/s and 4.4 mm/s.

However, for a low passage speed, for example 2.6 mm/s, despite a high Fe/C ratio (1.25%) and a low value of Vol tot $C_2H_2$, in this case below 3 liters, a proportion of disorganized additional carbon of between 30% and 50% is observed, and it is possible that the residence time of the reagents may take precedence over the $C_2H_2$ total volume and Fe/C parameters.

Without wishing to be bound any theory, the inventors think that the formation of the disorganized additional carbon is highly dependent on the Fe/C ratio (and on the quantity of iron in this case) and on the quantity of acetylene (which is controlled by the flowrate, the dilution level and/or the duration of synthesis); this is clear from a comparison between results obtained at the same volume of acetylene. To a lesser extent it is also dependent on the speed of passage and thereof on the residence time in the reactor. Thus a large quantity of acetylene, a low Fe/C ratio and a low passage speed favor a high level of disorganized additional carbon. On the other hand, a low acetylene quantity, a nigh Fe/C ratio and a high passage speed will favor a low level of disorganized additional carbon, or may even lead to its absence.

2. Manufacture and Characterization of Supercapacitors

Symmetrical supercapacitors were manufactured from the electrodes composed of the electrode materials described (VACNT according to the invention or activated carbon (abbreviated to AC) for comparative tests). Unless indicated to the contrary, the supercapacitors were produced by the symmetrical assembly of two single-phase electrodes (in the form of discs with a diameter of 10 mm) using a separator with a cellulosic base and an electrolyte of the tetraethyl-ammonium tetrafluoroborate type at 1 mol/liter in acetonitrile. These assemblies of electrodes were encapsulated in a system of the Swagelok® type.

Table 3 below presents the characteristics of the VACNTs of the various syntheses.

TABLE 3

| Characteristics of the VACNTs | | | | | | |
|---|---|---|---|---|---|---|
| Furnace reference and samples | Furnace 1 NI-836 | Furnace 1 NI-766 | Furnace 2 NGI-1067 | Furnace 2 NGI-1113 | Furnace 2 NGI-1050 | Pilot R1707041 CIC3 |
| Substrate | | | AlMg1 | | | AlMn1 |
| Mean height VACNT [μm] | 105 | 36 | 119 | 42 | 152 | 94 |
| Mean mass per unit area [mg/cm²] | 1.04 | 1.00 | 6.64 | 1.85 | 6.83 | 4.26 |
| Mean proportion of disorganized additional carbon [%] | 0 | 0 | 65 | 56 | 56 | 58 |

2.1 Comparison Between VACNT Electrodes with and without Disorganized Additional Carbon FIG. 13 depicts a 2.5 V Ragone diagram of a supercapacitor using a 1M $ET_4N$ $BF_4$ electrolyte in acetonitrile and two electrodes formed from VACNT mats with a thickness of 46 μm and 36 μm. The intensity of the current varies between 1 and 400 mA/cm². This diagram shows the energy (E) that can be stored by each material (E=½ CV²) as a function of the power (P) of the materials (P=E/t of discharge). It is observed that, with 56% disorganized additional carbon (sample NGI-1113; square dots), the system stores four times more energy for low powers than in the absence of disorganized additional carbon (sample NI-766, triangular dots). For a high power, it always stores more energy than a system not containing any disorganized additional carbon.

Figure 15:
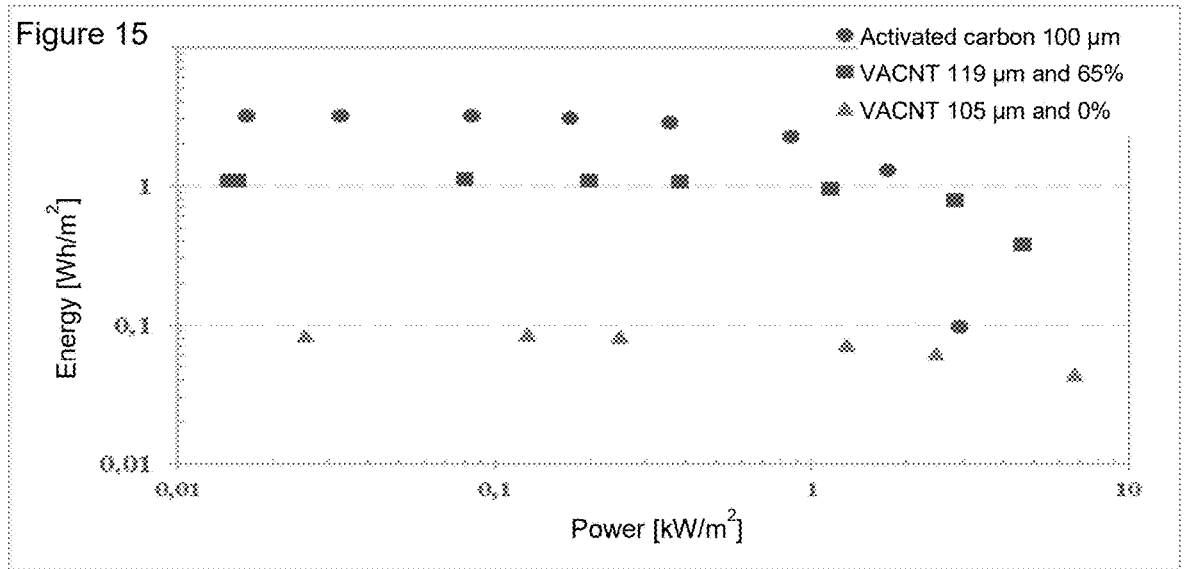
FIG. 15 shows a Ragone plot of the supercapacitors in FIG. 14 (square dots: 65% disorganized additional carbon; triangular dots: no disorganized additional carbon). The round dots correspond to a comparative supercapacitor with activated carbon electrodes (thickness 100 μm).

FIG. 14 shows a comparative voltammogram of two supercapacitors (diameter 10 mm) at 50 mV·s⁻¹, one comprises as electrode material a VACNT mat (reference NGI-1067) with a thickness of 105 μm and 119 μm with, respectively, 0% and 65% disorganized additional carbon, the other VACNT mat with the same thickness but without disorganized additional carbon (reference NI-836). The area lying in the curve represents the quantity of electricity stored by each system. It is observed that, in the system comprising electrodes with disorganized additional carbon, the area is increased by a factor of approximately ten compared with the area obtained with the system comprising electrodes without disorganized additional carbon. This means that the supercapacitor with electrodes comprising disorganized additional carbon can store approximately ten times more energy than a supercapacitor comprising electrodes without disorganized additional carbon. FIG. 15 is the corresponding Ragone diagram. It reflects the increase in the storage capacity per unit area by a factor of ten. In addition, for high charging and discharging times (high power, 3 kW/m²), these supercapacitors with VACNT electrodes with disorganized additional carbon make it possible to store almost ten times more energy per unit area than the supercapacitors with conventional electrodes based on activated carbon.

2.2 Comparison for Three Different Heights of the VACNT Mat

Figure 16:
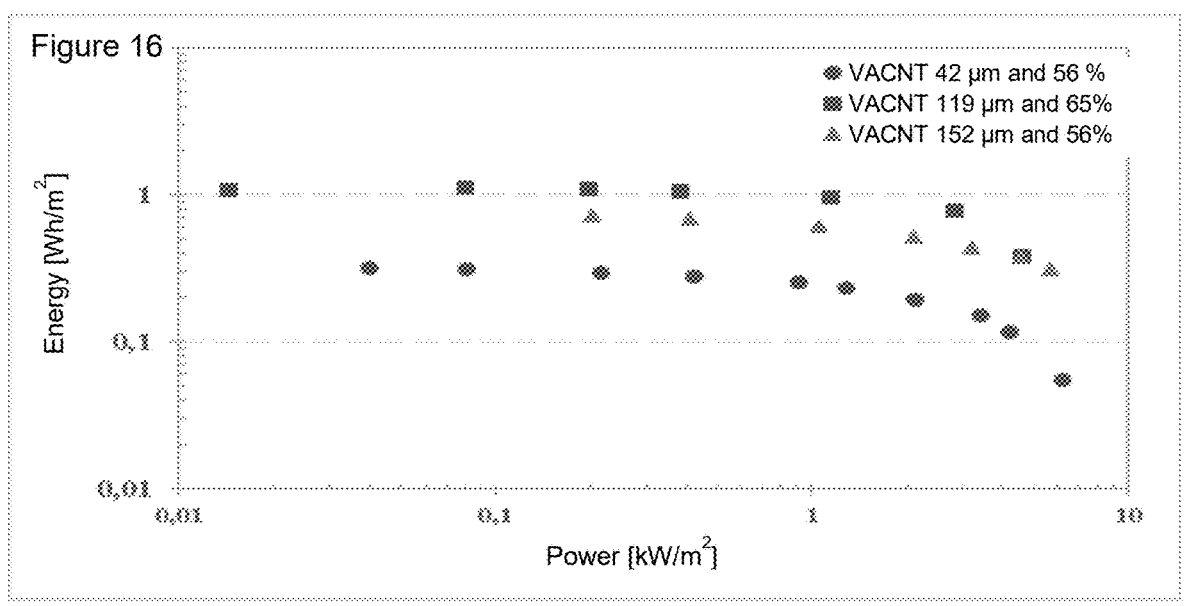
FIG. 16 shows a Ragone plot of three supercapacitors with electrodes having between 56% and 65% disorganized additional carbon, for three different mat heights: 42 μm (circular dots), 119 μm (square dots), 152 μm (triangular dots).

FIG. 16 is a Ragone diagram that compares the performances of supercapacitors according to the invention, based on VACNT containing disorganized additional carbon to the extent of 56% to 64%, for various thicknesses (heights) of VACNT mat. When the height of the mat is increased from 42 μm to 119 μm, the improvement in the performances in terms of energy stored is found; this effect does not depend on the power. By passing from a height of 119 μm to 152 μm (reference MGI-1050), a reduction in the quantity of energy per unit area is observed, even at low speed.

2.3 Comparison Between Supercapacitors According to the Invention and Commercial Supercapacitors with Electrodes Based on Activated Carbon In this example a symmetrical prismatic supercapacitor according to the invention (reference R1707041-C1-C3-Power) is compared with a commercial supercapacitor (reference Maxwell 10F BCAP0010). The supercapacitor according to the invention comprised two single-face electrodes (C1, C3) (rectangles with dimensions 4 cm×6 cm) based on a VACNT mat, separated by a cellulosic-based separator, and an electrolyte of the tetraethylammonium tetrafluoroborate type at 1 mol/liter in acetonitrile. The assembly was carried out in a flexible pouch (pouch cell). The electrodes based on VACNT mat had disorganized additional carbon; they came from the continuous reactor (Pilot SOI). The commercial supercapacitor (reference Maxwell 10F BCAP0010) was of the cylindrical coiled type and had electrodes made from activated carbon.

Figure 19A:
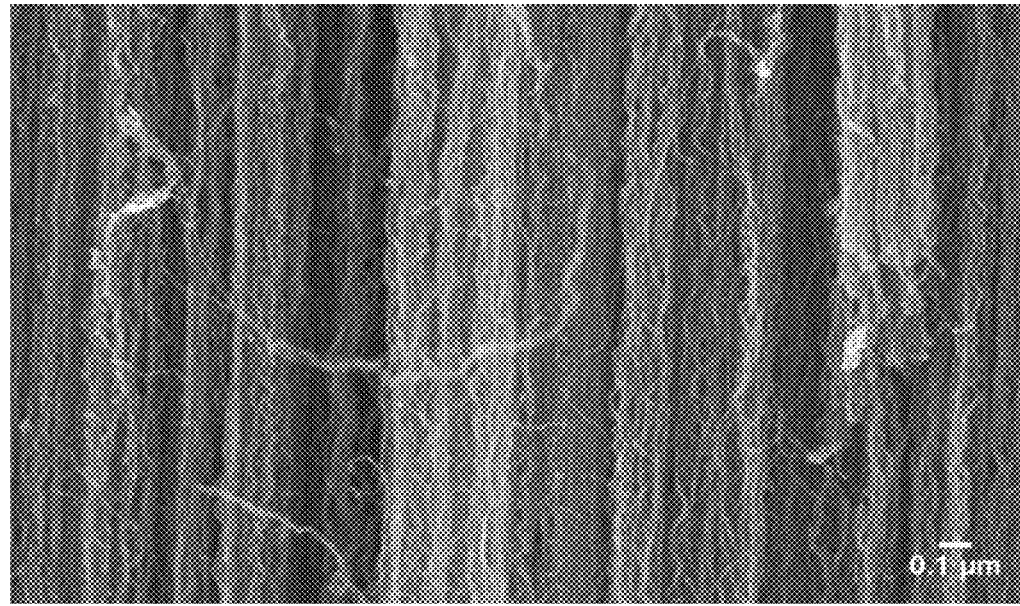
FIGS. 19(*a*)-19(*b*) show SEM micrographs taken at the middle of the VACNT mat of two electrodes according to the invention (FIG. 19(*a*): reference C1, FIG. 19(*b*): reference C3), used for manufacturing the supercapacitors described in example 2.3.
Figure 19B:
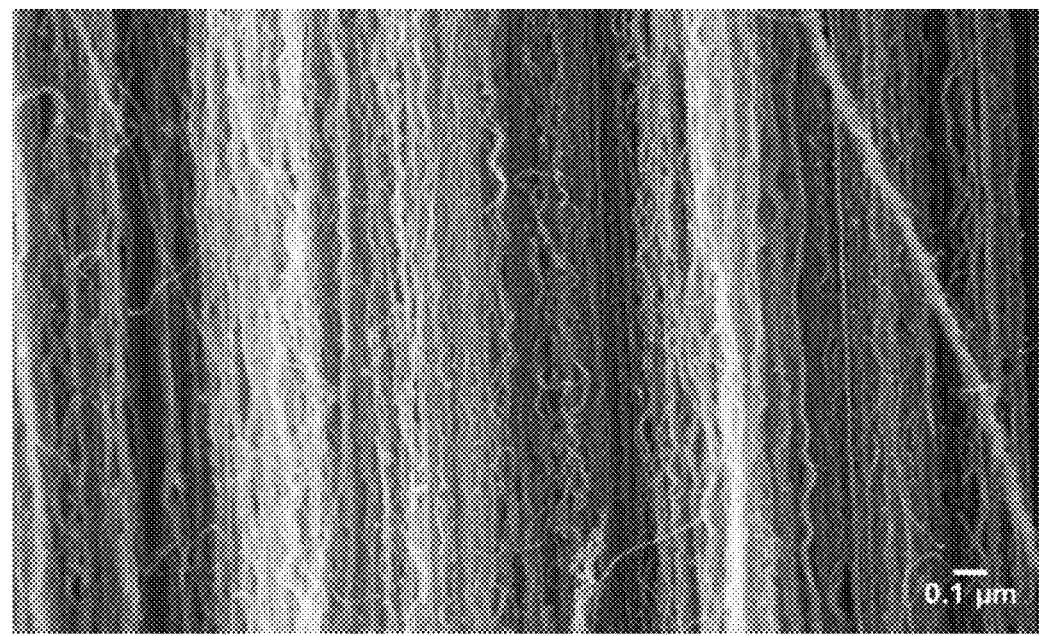

FIG. 19(*a*) shows an SEM micrograph of the VACNT mat of the electrode C1, FIG. 19(*b*) shows an SEM micrograph of the VACNT mat of electrode C3.

The sizing of the supercapacitor according to the invention, and in particular the sizing of its electrodes, was carried out so as to obtain, with activated carbon electrodes, performances (and in particular a capacitance of approximately 10 F) comparable to those of the commercial supercapacitor chosen as a comparison. The thickness of the active layers of the electrode was between 10 μm and 120 μm per face.

Figure 17:
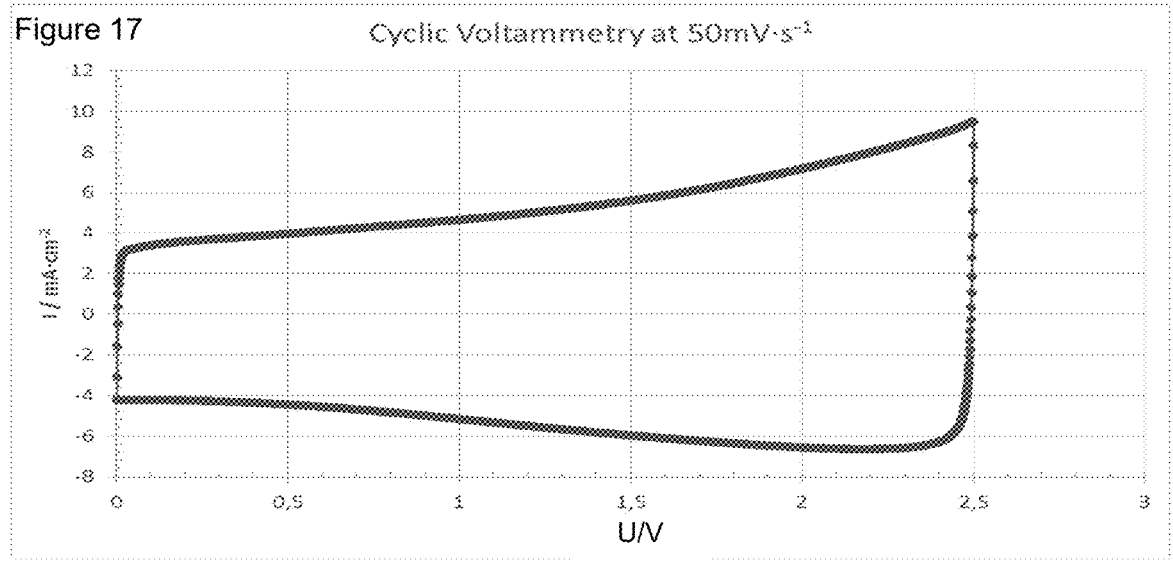
FIG. 17 shows a voltammogram of a supercapacitor in pouch-cell configuration with a 24 $cm^2$ surface area of supercapacitor, according to the invention with VACNT mat and disorganized additional carbon. Scanning speed: 50 $mV/s^{-1}$.

FIG. 17 shows a voltammogram at 50 mV·s$^{-1}$ of the supercapacitor according to the invention with VACNT mat and disorganized additional carbon. The form of the voltammogram and the surface current values are identical to those of a supercapacitor with disorganized additional carbon of smaller dimensions (sample NGI-1067, FIG. 14). This shows secondarily that changing from a batch furnace to a continuous furnace led to the same performances (the height of VACNT mat being the same, namely 100 μm).

Figure 18:
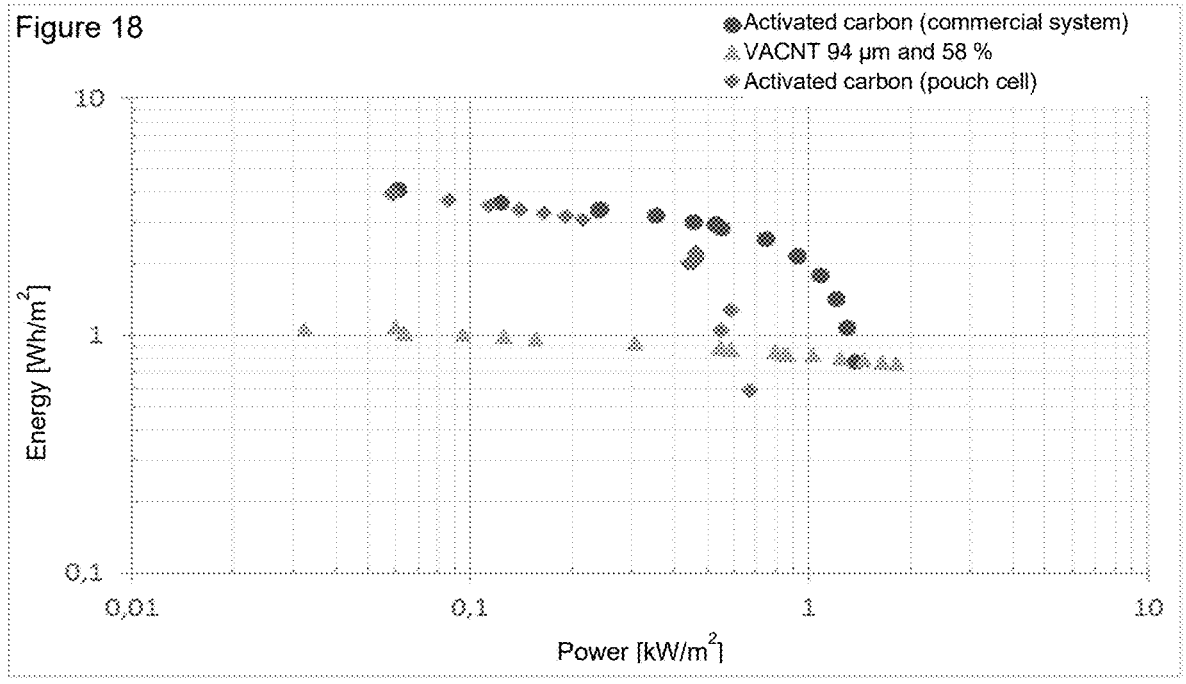
FIG. 18 shows a comparator Ragone diagram of a supercapacitor in pouch-cell configuration with a 24 $cm^2$ surface area of supercapacitor according to the invention (circular dots) and a commercial supercapacitor (triangular dots); thickness of the activated carbon electrode 100 μm.

FIG. 18 shows the comparative 2.5 V Ragone diagram of the three devices, namely of the device according to the invention (circular dots), of the commercial device (triangular dots, measured by the inventors under the same conditions as the other devices), and of a device according to the prior art assembled with activated carbon electrodes in a flexible enclosure (pouch cell). The intensity of the current varies between 10 and 400 mA/cm$^2$. This diagram shows the energy (E) that can be stored by each material (E=½ CV$^2$) as a function of the power (P) of the materials (P=E/t of discharge). It is observed that, at high power, the device according to the invention stores more energy than the commercial device. The differences in powers observed between FIGS. 15 and 18 for the same types of material can be explained by the different configuration of the system: the Swagelok® configuration (FIG. 15), exerting a greater pressure between the two electrodes of the system than in the prismatic Pouch-Cell configuration (FIG. 18). This difference in pressure is the cause of a difference in resistances of the supercapacitors having an impact on their behaviors at high current density.

The invention claimed is:

1. A method for preparing a composite that comprises vertically aligned carbon nanotubes (VACNTs) on a substrate and disorganized additional carbon with graphitic domains deposited on an external surface of the nanotubes, the method comprising chemical decomposition of a carbon-source gas in a reactor comprising a heated enclosure and growth of the VACNTs and graphitic domains on a substrate, in the presence of a catalyst, wherein:

a gaseous phase comprising the carbon source and catalyst precursor is injected continuously into the heated enclosure at a temperature of between 580° C. and 630° C. and at a pressure of between 0.5 bar and 1.5 bar, the catalyst precursor comprises ferrocene, the disorganized additional carbon comprises the graphitic domains and has a degree of semigraphitic organization in which a width ratio between band D and band G in a Raman spectrum of the VACNTs is greater than 2.0, the gaseous phase injected into the enclosure comprises acetylene as a source of carbon, toluene as a carrier gas for the catalyst precursor, hydrogen, and argon as an inert gas, and the growth of the VACNTs and the deposition of the disorganized additional carbon take place a single-step chemical vapor deposition process.

2. The method according to claim 1, wherein the gaseous phase injected into the enclosure consists essentially of acetylene as a source of carbon, hydrogen, ferrocene as a catalyst precursor, toluene as a carrier gas for the ferrocene, and argon as an inert gas.

3. The method according to claim 1, wherein the speed of passage of the gaseous phase is between 1 mm/s and 15 mm/s, and preferably between 3 mm/s and 10 mm/s.

4. The method according to claim 1, wherein the iron content based on the total carbon content in the gaseous phase is between 0.4% and 1.2%, preferably between 0.5% and 1.1%, and even more preferentially between 0.55% and 0.9% (as a percentage by mass).

5. The method according to claim 1, wherein the total volume of acetylene is between 0.7 and 6 ml/mm$^2$.

6. A supercapacitor device comprising two electrodes, wherein at least one of the two electrodes comprise the composite according to claim 1.

7. The supercapacitor device according to claim 6, wherein the two electrodes are contained in an enclosure, separated by a separator, and the supercapacitor device comprises an electrolyte that comprises at least one anion, at least one cation, and optionally a solvent.

8. The supercapacitor device according to claim 6, wherein the supercapacitor device is capable of storing energy of at least 0.8 Wh/m$^2$, preferably at least 1 Wh/m$^2$, and even more preferentially at least 2 Wh/m$^2$ for a power of between 0.01 and 1 kW/m$^2$.

9. A method for manufacturing a supercapacitor device, the method comprising:

providing a pair of electrodes, each comprising a composite comprising: a substrate, vertically aligned carbon nanotubes (VACNTs) grown on the substrate, and disorganized additional carbon comprising graphitic domains deposited on an external surface of the VACNTs, separators, current collectors, electrolyte, and an enclosure, wherein the disorganized additional carbon comprises the graphitic domains and has a degree of semigraphitic organization, and wherein the VACNTs and the disorganized additional carbon are formed simultaneously in a single-step chemical vapor deposition process using a gaseous phase comprising acetylene, hydrogen, ferrocene, toluene, and an inert gas;

welding the current collectors on the electrodes;

assembling the electrodes and separators to obtain an electrode/separator assembly;

welding the current collectors of the electrodes to the terminals of the enclosure;

fitting the electrode/separator assembly in the enclosure;

adding and diffusing the electrolyte in the enclosure; and sealing the enclosure.

10. The method according to claim 9, wherein the electrolyte is an ionic liquid containing a cation associated with an anion, or an electrolytic solution containing a salt dissolved in a solvent, the solvent being likely to be a protic solvent or an aprotic solvent or a mixture of at least one protic mixture of at least one aprotic solvent.

11. The method according to claim 10, wherein the aprotic solvent is chosen from halogenated alkanes such as dichloromethane; dimethylformamide (DMF); ketones such as acetone or 2 butanone; acetonitrile; tetrahydrofuran (THF); N-methylpyrrolidone (NMP); dimethyl sulfoxide (DMSO) and mixtures thereof; propylene carbonate; ethylene carbonate; dimethylcarbonate and mixtures thereof; and lactones such as $\gamma$-butyrolactone.

12. The method according to claim 10, wherein the ionic liquid is selected from the group consisting of:

ionic liquids containing quaternary ammonium ions, and in particular the ions of 1-ethyl-3-methyl imidazolium, 1-methyl-3-propyl imidazolium, 1-methyl-3-isopropyl imidazolium, 1-butyl-3-methyl imidazolium, 1-ethyl-2, 3-dimethyl imidazolium, 1 ethyl-3,4-dimethyl imidazolium, N-propyl pyridinium, N-butyl pyridinium, N-tert-butyl pyridinium, N-tert-butanol-pentyl pyridinium, N-methyl-N-propylpyrrolidinium, N-butyl-N-methyl-pyrrolidinium, N-methyl-N-pentyl pyrrolidinium, N-propoxyethyl-N-methyl pyrrolidinium, N-methyl-N-propyl piperidinium, N-methyl-N-isopropyl piperidinium, N-butyl-N-methyl piperidinium, N—N-isobutylmethyl piperidinium, N-sec-butyl-N-methyl piperidinium, N-methoxy-N-ethylmethyl piperidinium, and N-ethoxyethyl-N-methyl piperidinium; and ionic liquids containing ammonium ions such as the butyl-N—N-trimethyl ammonium, N-ethyl-N,N-dimethyl-N-ammonium and N,N,N-trimethyl ammonium ions, associated with any anion such as the tetrafluoroborate ($BF_4^-$), hexafluorophosphate ($PF_6^-$), bis(trifluoromethane-sulfonyl)amide ($TFSI^-$) or bis(fluorosulfonyl)amides (FSI) ions.

13. The method according to claim 9, wherein the electrolyte comprises an ionic liquid comprising:

at least one cation selected from the group consisting of the derivatives of pyridine, pyridazine, pyrimidine, pyrazine, imidazole, pyrazole, thiazole, oxazole, triazole, ammonium, pyrrolidine, pyrroline, pyrrole, and piperidine; and at least one anion selected from the group consisting of $F^-$, $Cl^-$, $Br^-$, $I^-$, $NO_3^-$, $N(CN)_2^-$, $BF_4^-$, $ClO_4^-$, $PF_6^-$, $RSO_3^-$, $RCOO^-$, where R is an alkyl or phenyl group, $(CF_3)_2PF_4^-$, $(CF_3)_3PF_3$, $(CF_3)_4PF_2^-$, $(CF_3)_5PF^-$, $(CF_3)_6$ $P^-$, $(CF_2SO_3^-)_2$, $(CF_2CF_2SO_3^-)_2$, $(CF_3SO_2^-)_2$ $N^-$, $(CF_3CF_2(CF_3)_2CO^-$, $(CF_3SO_2^-)_2CH^-$, $(SF_5)_3C$, $(CF_3SO_2)_3C$, $[O(CF_3)_2C_2(CF_3)_2O]_2PO^-$, $CF_3(CF_2)_7SO_3^-$, 1-ethyl-3-methylimidazole, bis(trifluoro-methylsulfonyl)imide ([EMIM][Tf2M]).

14. The method according to claim 10, wherein the electrolytic solution comprises, in addition to a solvent, an electrolyte in the form of a salt dissolved in a solvent, knowing that:

an anion of this salt is advantageously chosen from:

inorganic ions such as $F^-$, $Br^-$, $Cl^-$, $I$, $HCO_3^-$, $H_2PO_4^-$, $Cr_2O_4^{3-}$, $BF^{4-}$, $PF_6^-$, or $N(CN)_2^-$;

organic anions, preferably selected from the group consisting of: $RSO_3^-$, $RCOO^-$ (where R is an alkyl or phenyl group, possibly substituted); $(CF_3)_2PF_4$, $(CF_3)_3PF_3$, $(CF_3)_4PF_2^-$, $(CF_3)_5PF^-$, $(CF_3)_6P^-$, $(CF_2SO_3^-)_2$, $(CF_2CF_2SO_3^-)_2$, $(CF_3SO_2^-)_2N^-$, $(CF_3CF_2(CF_3)_2CO^-$, $(CF_3SO_2^-)_2CH^-$, $(SF_5)_3C^-$, $(CF_3SO_2SO_2)_3C^-$, $[O(CF_3)_2C_2(CF_3)_2O]_2PO$, $CF_3(CF_2)SO_3^-$, bis(trifluoro-methanesulfonyl)amide, bis (fluorosulfonyl) amide;

polymeric anions; and biological anions; and/or the cation of this salt is a metallic cation, preferably selected from the group consisting of $Li^+$, $Na^+$, $Mg^{2+}$, $Cu^{2+}$, $Zn^{2+}$ and $Al^{3+}$ or organic cations.

15. The method according to claim 1, wherein the speed of passage of the flow of gases is between 1 mm/s and 15 mm/s.

16. The method according to claim 1, wherein the speed of passage of the flow of gases is between 3 mm/s and 10 mm/s.

17. The method according to claim 9, wherein the composite comprises between 30% and 65% disorganized additional carbon by mass, based on the mass of the VACNTs.

* * * * *